United States Patent
Mannby et al.

(10) Patent No.: US 10,963,640 B2
(45) Date of Patent: Mar. 30, 2021

(54) SYSTEM AND METHOD FOR COOPERATIVE TEXT RECOMMENDATION ACCEPTANCE IN A USER INTERFACE

(71) Applicant: Microsoft Technology Licensing, LLC, Redmond, WA (US)

(72) Inventors: Claes-Fredrik U. Mannby, Mercer Island, WA (US); Matthew McGlynn, Bellevue, WA (US); Yifan Wu, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/457,220

(22) Filed: Jun. 28, 2019

(65) Prior Publication Data

US 2020/0410051 A1 Dec. 31, 2020

(51) Int. Cl.
| | |
|---|---|
| *G06F 17/00* | (2019.01) |
| *G06F 40/274* | (2020.01) |
| *G06K 9/62* | (2006.01) |
| *G06K 9/72* | (2006.01) |
| *G06F 40/253* | (2020.01) |

(52) U.S. Cl.
CPC .......... *G06F 40/274* (2020.01); *G06F 40/253* (2020.01); *G06K 9/6298* (2013.01); *G06K 9/723* (2013.01)

(58) Field of Classification Search
CPC ..... G06F 40/274; G06F 40/253; G06K 9/723; G06K 9/6298
See application file for complete search history.

(56) References Cited

U.S. PATENT DOCUMENTS

| | | | |
|---|---|---|---|
| 6,377,965 B1 | 4/2002 | Hachamovitch et al. | |
| 8,712,931 B1 * | 4/2014 | Wahlen | G06F 3/0237 706/12 |
| 9,471,709 B1 * | 10/2016 | Zinenko | G06F 16/951 |

(Continued)

FOREIGN PATENT DOCUMENTS

EP 2669782 A1 12/2013

OTHER PUBLICATIONS

"International Search Report and Written Opinion Issued in PCT Application No. PCT/US2020/031245", dated Aug. 25, 2020, 11 Pages.

*Primary Examiner* — Andrew T McIntosh
(74) *Attorney, Agent, or Firm* — Fiala & Weaver P.L.L.C.

(57) ABSTRACT

Methods for cooperative text recommendation acceptance of completion options in a user interface are performed by systems and devices. A user provides inputs via a user interface (UI) that are stored in an input buffer. As a portion of a first input is received, completion options for some part of the first input are determined based on statistical probabilities and the portion. A completion option is selected and displayed via the UI as completing the first input in a differentiated manner from the user-entered input. The user then either generates an acceptance command for the completion option or continues providing the first input and the UI adapts the remaining completion option portion. Acceptance commands are accepted as space characters or as alphanumeric characters representing additional input that follows the first input and the completion option. Statistical likelihoods are used to account for typographical errors and misspellings in user inputs.

20 Claims, 8 Drawing Sheets

(56) References Cited

U.S. PATENT DOCUMENTS

| | | | |
|---|---|---|---|
| 2007/0106937 A1* | 5/2007 | Cucerzan | G06F 16/9535 |
| | | | 715/257 |
| 2008/0109220 A1* | 5/2008 | Kiss | G10L 15/26 |
| | | | 704/235 |
| 2010/0114887 A1* | 5/2010 | Conway | G06F 16/374 |
| | | | 707/737 |
| 2014/0012567 A1* | 1/2014 | Caskey | G06F 40/274 |
| | | | 704/9 |

* cited by examiner

SYSTEM AND METHOD FOR COOPERATIVE TEXT RECOMMENDATION ACCEPTANCE IN A USER INTERFACE

BACKGROUND

User interfaces (UIs) may provide users with options for text completion based on characters the user has input. For example, a user may type one, two, or three letters using a keyboard and those letters appear in the UI, and the UI may then provide a completion example to the user in the form of a word or phrase that the user accepts by hitting the "tab" key or selecting the completion example itself from part of the UI.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods for cooperative text recommendation acceptance of completion options in a user interface (UI) are performed by systems, devices, and apparatuses. A user may provide inputs, via a user interface (UI) of an application, that are stored in an input buffer of the system. As a portion of a first input is received, completion options for a portion of the first input is determined based on statistical probabilities and the portion. A completion option representing a completion of the portion of the input is selected and recommended to the user, via display at the UI. The completion option is displayed as completing the first input and in a differentiated manner, or with differentiating characteristics, from the user-entered input portion. The user then either generates an acceptance command for the recommended completion option or continues providing the first input to which the UI adapts the remaining portion of the completion option. Acceptance commands are accepted as space characters or as alphanumeric characters representing additional input that follows the first input and the recommended completion option. Statistical likelihoods are used to account for typographical errors and misspellings in user inputs.

Further features and advantages, as well as the structure and operation of various examples, are described in detail below with reference to the accompanying drawings. It is noted that the ideas and techniques are not limited to the specific examples described herein. Such examples are presented herein for illustrative purposes only. Additional examples will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
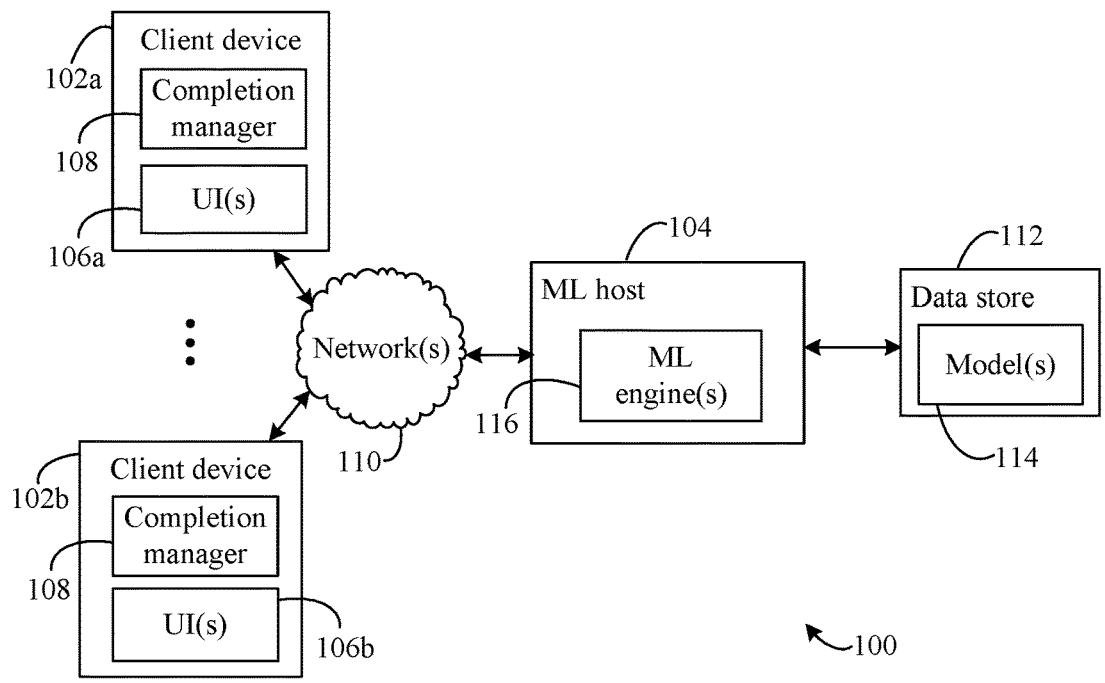
FIG. 1 shows a block diagram of a networked system for cooperative text recommendation acceptance in a user interface (UI), according to an example embodiment.

The features and advantages of embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially," "approximately," and "about" modifying a condition or relationship characteristic of a feature or features of an embodiment of the disclosure, are understood to mean that the condition or characteristic is defined to be within tolerances that are acceptable for operation of the embodiment for an application for which it is intended.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures and drawings described herein can be spatially arranged in any orientation or manner. Additionally, the drawings may not be provided to scale, and orientations or organization of elements of the drawings may vary in embodiments.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Section II below describes example embodiments for cooperative text recommendation acceptance in a user interface. Section III below describes example mobile device and computing device embodiments that may be used to implement features of the embodiments described herein. Section IV below describes additional examples and advantages, and Section V provides some concluding remarks.

II. Example Embodiments For Cooperative Text Recommendation Acceptance in a User Interface Methods, systems, apparatuses, devices, and computer program products are provided herein for cooperative text recommendation acceptance in a user interface (UI). Users may input content such as text via keyboard entry, and based on initial characters or content entered, a completion option may be generated as a prediction recommendation and displayed to the user via a UI for acceptance by pressing the space bar or simply continuing with content that the user desires to input after the completion. For example, completion options may be generated/predicted and these recommendations may be displayed to the user based on statistics and probabilities given current and prior user inputs, language models specific to the user, and/or the like. The displaying of recommended completion options may be performed in a manner that differentiates the predicted, recommended completion options from user-entered or previously accepted content. Statistics and probabilities utilized may be generated for each possible recommendation that represents a completion option of the user input. One completion option may be selected as the predicted recommendation based on its statistical probability, and the selected completion option may be displayed to the user via the UI with a characteristic, such as a color, font style, and/or opacity, that is different from the content or characters input initially by the user. When an acceptance input provided by the user is received, an acceptance command is generated to cause the acceptance of the selected completion option to be reflected via the UI.

Thus, the embodiments herein provide for improvements in UI capabilities that allow for more efficient entry of content via UIs. As an example of such improvements, consider that for a user that is fast typist, current inline predictions, when used, can in fact slow down typing speeds. During fast typing, a user must recognize a correct prediction recommendation displayed and then essentially schedule a finger to type the "tab" or expressly select the prediction recommendation on a part of the UI. This disrupts the flow of the user's typing and thought process, and impedes typing efficiency and speed, especially for users that are fast typists. Additionally, it is often the case for fast typists that the user simply continues typing and does not realize that the UI provided a predicted and desired completion option until they are finished or almost finished with the text being input.

In contrast, the embodiments herein provide for the ability to allow users that are fast typists, e.g., power users, to still get value out of inline input prediction recommendations by increasing UI input efficiency and speed through intelligently and cooperatively interacting with the user and recommending completion options while understanding that the user has recognized the prediction as being a desirable or correct addition to their input. That is, rather than pressing the "tab" key on the keyboard, or tapping the recommendation on a separate part of the UI, and then continuing with entry of further input content, according to the embodiments, a user is enabled to simply press the space bar on the keyboard as would occur during the normal flow of content input, or even to merely continue typing the subsequent text that is desired to come after the recommended completion option that is predicted without performing a separate activation action that differs from what the user desires to type.

Continuing with the example above, if a user starts typing "Le" and a conventional system assumes the user is going to type "Let me know if you have any questions?", the recommendation may be shown as text following the current cursor position, and the completion is performed at once when the user presses the tab key, or is advanced through the suggested text one word at a time each time the user presses the tab key. These patterns are problematic because if the user types quickly the tab key on a keyboard is located outside of the group of alphanumeric keys, and the loop of seeing a recommendation, changing the keystrokes currently queued in the user's mind, queueing a tab key, the expectation of observing the suggested word/phrase turn black indicating acceptance, then resuming with the next word breaks the user's flow, both mentally and physically for typing, and slows down the user's content entry.

The embodiments described provide for UI improvements that allow improved efficiency for entry of inputs through cooperative text recommendation acceptance in a user interface. For instance, if the user can be certain that (1) she can always just fully type anything regardless of the completion option being displayed as differentiated text after the currently provided input, that (2) she can reliably assume that the recommended completion option text has already been converted to accepted text in the input entry text format, that (3) the cursor will be moved to the right of the completion option text, and that (4) she can continue typing the desired word following the completion option text, then the user can more efficiently utilize the predicted recommendations without significant distraction which improves input entry via the UI. That is, all the user has to think of doing is to simply "skip" typing text that has already appeared on the screen as completion option text, allowing already-mentally-queued actions to complete via the UI, and then adding on new content, rather than directly interacting with the completion option system recommendations.

In collaborating with a fast typist, embodiments herein provide for systems that achieve a high level of confidence in knowing what the user is typing through the use of statistical probabilities. For example, a system herein may show the entire predicted completion option text, and "eat" (i.e., treat simply as confirmation, moving the cursor along to match typed text) additional user input as long as this input continues to match, or roughly match (i.e., as determined by an error corrector of the system), the recommendation. Moreover, the embodiments herein allow for key-adjacency errors, typographical errors, and intentional misspelling errors by providing backward or current-key correction based on statistical likelihoods or weighted statistical likelihoods. In embodiments, different methods of prediction may be applied with respect to statistics and probabilities, including, but without limitation, table lookups, neural networks, expert systems, Bayesian networks, etc. Additionally, if further user input appears to not match the predicted completion option recommended, the described systems herein evaluate whether the mismatched input is a continuation of the completion option and the user perceived, and accepted, the predicted recommendation. If so, the mismatched text is appended to follow after the prediction. On the other hand, the described systems herein are configured to determine whether to abort the continuation/completion and simply accept the typed stream of characters while removing the predicted completion option from display to the user via the UI. In some embodiments, the system further makes it trivial to switch to the alternate interpretation, should it have made the incorrect determination, e.g., by having the user type the ESC key, by receiving a vocalized "No" through a microphone, or even through re-evaluation after receiving more input following the point at which the decision was made.

In some embodiments, the systems herein may also evaluate whether a typed key, such as a space character, should be interpreted as an acceptance of the predicted completion option text recommended to the user, or interpreted as simply another keystroke of the user in their currently-provided input.

As an example, if a user desires to type "I just wanted to follow up with you" and has provided a portion of this input ("I jus") via the keyboard, embodiments herein may provide that "I just wanted to follow up" be displayed to the user, determining the italicized and bolded portion as the recommended completion option. When a user provides a space character as the next input, it may be determined that the space, being in the middle of the word "just" after the 's', is intended as an acceptance of the completion option. Likewise, when a user provides the letter 'w', it may be determined that is an indication of acceptance of the completion option and the user's desire to continue with this collaboration. In this case, the 'w' signifies the word "with" which may be determined statistically as a follow on or continuation of "I just wanted to follow up." Thus, when the user provides the 'w', this letter is displayed as following the recommended completion option displayed to the user and the completion option is changed to the accepted, normal input font ("I just wanted to follow up w"), and the user continues her input of the word "with."

Heuristics and language model data may be implemented according to embodiments to determine whether the user has skipped completion option text for acceptance or is providing an input that differs from the recommended completion option text suggested to the user via the UI. For instances in which the completion option text is not what the user desires, embodiments herein provide for the capability to repair or correct a given collaboration and replace it with the other assumption (i.e., that the user did not want to accept any part of the suggestion), such as by pressing the escape <ESC> key on the keyboard, a combination of the control key and the 'z' key <Ctrl+Z>, the backspace key, etc.

Context information related to the content may also be used in determining the scope of selections for the content. For instance, characters, words, names, phrases, grammatical portions of sentences such as subjects, predicates, prepositions, etc., sentences, paragraphs, and/or the like, may be selected based on the content being text and/or recognition of these portions of the content.

Input content may be any type of input modality including, without limitation, typed characters, handwritten characters, audio/voice data, video/motion data, virtual environment/3-D constructs, and/or the like. That is, it should be noted that while text entry is described for embodiments by way of exemplary illustration, the embodiments herein are not so limited.

In other words, the embodiments disclosed herein provide cooperative input recommendation acceptance, including text inputs. These and further embodiments are described in greater detail as follows.

Systems and devices may be configured in various ways for cooperative text recommendation acceptance in a UI. For instance, FIG. 1 is a block diagram of a computing system 100 ("system 100" hereinafter), according to embodiments. System 100 is configured to enable cooperative text recommendation acceptance in a UI, according to embodiments. As shown in FIG. 1, system 100 includes a client device 102a, a client device 102b, and a machine learning host 104, which may communicate with each other over a network 110. It should be noted that any numbers of client devices and/or ML hosts may be present in various embodiments. Additionally, any combination of the components illustrated in FIG. 1 may be present in system 100, according to embodiments.

As noted above, client device 102a, client device 102b, and ML host 104 are communicatively coupled via network 110. Network 110 may comprise any type of communication links that connect computing devices and servers such as, but not limited to, the Internet, wired or wireless networks and portions thereof, point-to-point connections, local area networks, enterprise networks, and/or the like.

ML host 104 may comprise one or more server computers or computing devices, which may include one or more distributed or "cloud-based" servers. In embodiments, ML host 104 may be associated with, or may be a part of, a cloud-based service platform such as Microsoft® Azure® from Microsoft Corporation of Redmond, Wash. Client devices such as client device 102a and/or client device 102b may be configured to provide information associated with completion options for cooperative text recommendation acceptance to ML host 104 via network 110. ML host 104 may be configured to train/re-train cooperative models and/or user language models using machine learning techniques and based on the information received from client devices. In embodiments, neural networks may be implemented by ML host 104 to update models.

For instance, if a user accepts, or corrects, a completion option as described herein, information associated with the recommendation may be provided to ML host 104 to improve cooperative models and/or user language models. Such information may include, without limitation, indicia of the acceptance or correction, a statistical probability for the completion option, context surrounding the user input and the completion model (which may include prior or subsequent inputs stored in an input buffer of a client device), error correction information, and/or the like. In other words, ML host 104 may utilize positive and/or negative information related to a user's collaboration experience, via recurrent neural networks, machine learning algorithms, etc., of one or more ML engines 116, and/or the like, to refine the models herein. Such refined models may be stored in a data store 112 as model(S) 114 and/or may be provided from ML host 104, or from data store 112, to client device 102a and/or client device 102b via network 110 for implementation.

Data store 112 may be a stand-alone storage system, and/or may be internally or externally associated with ML host 104. In embodiments, data store 112 may be communicatively coupled to other systems and/or devices via network 112. That is, data store 112 may be any type of storage device or array of devices, and while shown as being communicatively coupled to ML host 104, may be networked storage that is accessible via network 112. Additional instances of data store 112 may be included in addition to, or in lieu of, the embodiment shown.

It should be noted that as described herein, embodiments of ML host 104 are applicable to any type of system where a system for machine learning communicates with client devices over a network. One example noted above is where ML host 104 is a "cloud" implementation, application, or service in a network architecture/platform. A cloud platform may include a networked set of computing resources, including servers, routers, etc., that are configurable, shareable, provide data security, and are accessible over a network such as the Internet. Cloud applications/services such as for machine learning may run on these computing resources, often atop operating systems that run on the resources, for entities that access the applications/services over the network. A cloud platform may support multi-tenancy, where cloud platform-based software services multiple tenants, with each tenant including one or more users who share common access to software services of the cloud platform. Furthermore, a cloud platform may support hypervisors implemented as hardware, software, and/or firmware that run virtual machines (emulated computer systems, including operating systems) for tenants. A hypervisor presents a virtual operating platform for tenants.

Client device 102a and/or client device 102b may be any type of computing device or computing system, including a terminal, a personal computer, a laptop computer, a tablet device, a smart phone, a personal digital assistant, a game console or gaming device, a television, and/or the like that may be utilized by users through interactions for content input via a user interface(s) (e.g., UI(s) 106a and/or UI(s) 106b, respectively) that display the user inputs and completion options described herein. In embodiments, client device 102a and/or client device 102b may each comprise various input/output (I/O) modalities for input entry by users and display thereof to the users.

Client devices described herein may be configured to execute software applications that cause content associated with user inputs to be displayed to users via UIs, e.g., UI(s) 106a of client device 102a and/or UI(s) 106b of client device 102b. Such software applications may also enable users to perform cooperative text recommendation acceptance via UI(s) 106a of client device 102a and/or UI(s) 106b of client device 102b. As illustrated, client device 102a and/or client device 102b may include an instance of a completion manager 108. Completion manager 108 may be a part of a client device operating system (OS) or an application installed at the client device, may be an application itself, etc., in various embodiments. Completion manager 108 is configured to perform operations for cooperative text recommendation acceptance in a UI, as described in further detail herein.

For example, as noted above, if a user desires to type "I just wanted to follow up with you" and has provided a portion of this input ("I jus") via the keyboard, embodiments herein may provide that "I just wanted to follow up" be displayed to the user, determining the italicized and bolded portion as the recommended completion option. A user may provide a space character as the next input, and it may be determined that the space, being in the middle of the word "just" after the 's', is intended as an acceptance of the completion option. A user may alternatively provide the letter 'w', and it may be determined that this input is an indication of acceptance of the completion option because the 'w' signifies the word "with" which may be determined statistically as a follow on or continuation of "I just wanted to follow up." Thus, the 'w' is displayed as following the recommended completion option which is accepted, providing "I just wanted to follow up w" as displayed to the user, allowing the user to continue her input of the word "with."

Completion manager 108 may be implemented in hardware, hardware combined with one or both of software and/or firmware, and/or as program instructions encoded on computer-readable storage media, and may be configured to perform any functions and/or operations described herein for cooperative text recommendation acceptance in a UI.

It should also be noted that while embodiments herein are described with respect to keyboard-entry of inputs for client devices, other types of input modalities are contemplated herein, as are other types of non-client devices, e.g., servers, etc.

Figure 2:
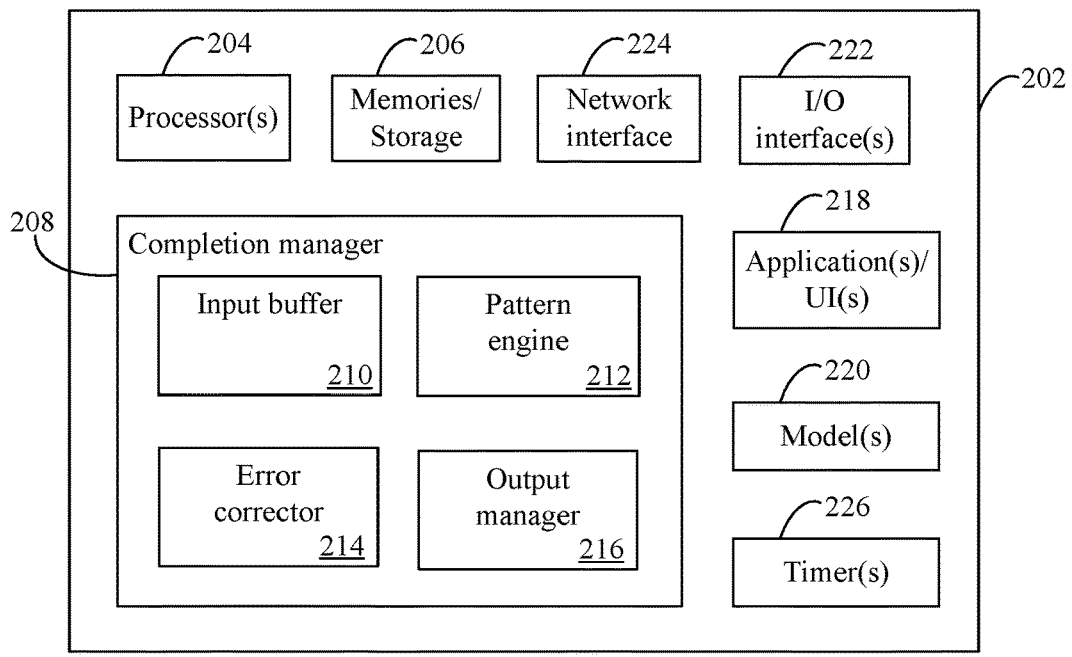
FIG. 2 shows a block diagram of a computing system for cooperative text recommendation acceptance in a UI, according to an example embodiment.

Accordingly, a client device, such as client device 102a and/or client device 102b, may be configured in various ways for cooperative text recommendation acceptance of completion inputs in a UI. For example, FIG. 2 is a block diagram of a client system 200 ("system 200" herein) configured for such improvements and enhancements. System 200 may be an embodiment of system 100 of FIG. 1, e.g., client device 102a and/or client device 102b. System 200 is described as follows.

System 200 includes a computing device 202, which may be an embodiment of client device 102a and/or client device 102b of FIG. 1, and may be any type of computer or computing device, as mentioned elsewhere herein, or as otherwise known. As shown in FIG. 2, system 200 and computing device 202 include one or more of a processor ("processor") 204, one or more of a memory and/or other physical storage device ("memory") 206, one or more network interfaces ("network interface") 224, and a completion manager 208 that may be an embodiment of completion manager 108 of FIG. 1. System 200 may also include an input/output (I/O) interface(s) 222, and an application(s)/UI(s) 224 ("UI(s) 224" hereinafter for brevity) which may be an embodiment of UI(s) 106a and/or 106b of FIG. 1 described above. System 200 may also include one or more timers 226 ("timers" 226), as well as additional components (not shown for brevity and illustrative clarity) including, but not limited to, components and subcomponents of other devices and/or systems herein, as well as those described below with respect to FIGS. 12 and 13, such as an operating system.

Processor 204 and memory 206 may respectively be any type of processor circuit and memory that is described herein, and/or as would be understood by a person of skill in the relevant art(s) having the benefit of this disclosure. Processor 204 and memory 206 may each respectively comprise one or more processors or memories, different types of processors or memories, remote processors or memories, and/or distributed processors or memories. Processor 204 comprises circuitry that is configured to execute computer program instructions such as but not limited to embodiments of completion manager 208, which may be implemented as computer program instructions for cooperative text recommendation acceptance of completion options in UIs, etc., as described herein. Memory 206 is configured to store such computer program instructions/code, as well as to store other information and data described in this disclosure including, without limitation, one or more data structures including: prior inputs, e.g., as part of an input buffer, phonemes, words, phrases, acronyms, n-grams, and/or abbreviations for determinations of completion options, models described herein, threshold values, numbers of acceptances and/or corrections for selected completion options, etc.

Network interface 224 may be any type or number of wired and/or wireless network adapter, modem, etc., configured to enable system 200 to communicate with other devices over a network, such as communications between system 200 and other devices utilized in a network as described herein (e.g., client device 102a, client device 102b, and/or ML host 104) over a network such as network 110 as described above with respect to FIG. 1.

I/O interface(s) 222 may comprise hardware and/or software and may support any number of input devices and instruments (i.e., different input modalities) such as a stylus, a light pen, a mouse, a touch screen, a touch pad, a microphone, a camera, a kinetic sensor, a physical or virtual keyboard, a trackball, virtual reality eyewear, gloves, other wearables or sensors, etc., and/or the like, and one or more output devices such as a speaker, a display screen, a touch screen and/or the like. Devices such as touch screens and touch pads may also support human touch (e.g., with a finger or other body part as the instrument). In embodiments, I/O interface(s) 222 may comprise both input and output portions, e.g., a touchscreen, a headset, smart glasses, etc. Additional details for I/O devices supported by I/O interface(s) 222 are described below with respect to FIGS. 11-13.

UI(s) 224 may include, without limitation, any type of software or hardware UI implementation. UI(s) 224 may be, for example, user interfaces displayed to users via output devices described herein that may be interacted with via input devices described herein. UI(s) 224 may comprise portions of any types of software applications, such as but not limited to, an OS, web browsers, productivity software, electronic mail applications, messaging applications, audio applications, video applications, audio/video applications, 3-D software/virtual environments, etc. UI(s) 224 may display content that represents user inputs, as described herein, such as, but not limited to typed text, voice-to-text transcriptions, handwritten text, and/or the like.

Completion manager 208 may include a plurality of components for performing the functions and operations described herein for cooperative text recommendation acceptance of completion options in a UI. As shown, completion manager 208 includes an input buffer 210, a pattern engine 212, an error corrector 214, and an output manager 216. While shown separately for illustrative clarity, in embodiments, one or more of input buffer 210, pattern engine 212, error corrector 214, and/or output manager 216, may be combined together and/or as a part of other components of system 200. In some embodiments, less than all of the components of completion manager 208 illustrated in FIG. 2 may be included. In software implementations, one or more components of completion manager 208 may be stored in memory 206 and are executed by processor 204.

Input buffer 210 may be configured to receive inputs from users via one or more input interfaces of I/O interface(s) 222. In embodiments, input buffer 210 may comprise buffer management logic, for managing prior inputs in memory and monitoring incoming inputs generated by users, that interfaces with data structures having information in memory 206. That is, input buffer 210 may include portions of memory 206, in some embodiments. Input manager 210 may be configured to store incoming inputs in such data structures in memory 206, to provide inputs to other components of completion manager 208, etc. Input buffer 210 may be configured to be of different sizes, as measured in entries, characters, words, bytes, kilobytes, etc.

Pattern engine 212 may be configured to receive inputs from input buffer 210 and determine completion options to recommend to users for completions of user inputs. Pattern engine 212 may be configured to determine context information related to content of user inputs and determine statistical probabilities for possible completion options, and to select one completion option for display to the user based thereon. Pattern engine 212 may also be configured to determine whether subsequent user inputs correspond to acceptance commands for completion options, or whether the user desires to ignore the recommended completion options in favor of their own entered inputs.

Statistical probabilities may be based on one or more of inputs stored by input buffer 210, a language model(s) of the user, a number of characters in a portion of entered input, a likelihood (or weighted likelihood) of subsequent input following entered input, and/or the like. Context information may be based, without limitation, on one or more of semantics of the content, a type of application related to the content, other users associated with an application for a UI, other information presented in the UI, keywords, language models, etc. Additional details regarding pattern engine 212 are provided below.

Error corrector 214 may be configured to monitor user inputs and identify or determine possible errors therein, as well as possible errors in prior inputs stored in input buffer 210. Error corrector 214 may be configured to determine possible corrections for selected completion options and/or prior inputs based on subsequent inputs, according to embodiments. Potential errors may include, without limitation, typographical errors such as transposed characters, adjacent key presses, multiple key presses, misspellings by the user, and/or the like, in embodiments.

Output manager 216 may be configured to cause the display of user-entered inputs and completion options determined pattern engine 212 via a UI, e.g., UI(s) 218. Output manager 216 may also be configured to provide completion options to UIs of UI(s) 224 for display in a manner or with a characteristic(s) that differentiates the completion option from user-entered text. For example, output manager 216 may cause completion options to be displayed as highlighted in a color, underlined, bolded, italicized, in a different font, with different opacity, and/or the like, alone or in any combination thereof. Output manager 216 may also be configured to show acceptance of completion options based on acceptance commands by causing the display of the completion options, or portions thereof, to match the characteristics of the user-entered input.

Timers 226 may include one or more timers that may be utilized by completion manager 208, as well by its subcomponents, to perform operations based on timing with respect to events, as described further herein.

Accordingly, completion manager 208 may operate in various ways to enable improvements in cooperative text recommendation acceptance of completion options in a UI. Additional details regarding completion manager 208 and its components are provided below.

Figure 3:
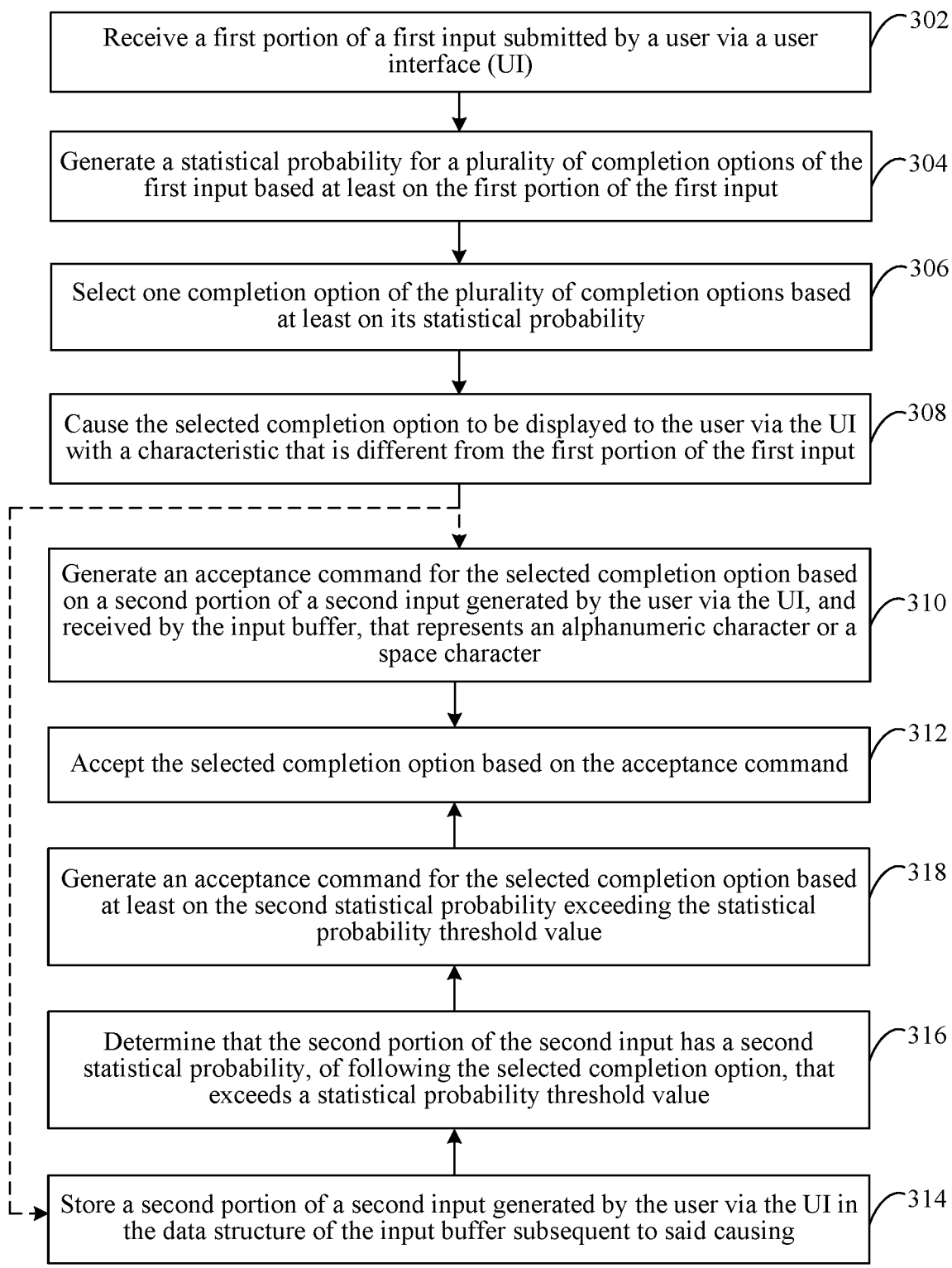
FIG. 3 shows a flowchart for cooperative text recommendation acceptance in a UI, in accordance with an example embodiment.

For instance, FIG. 3 shows a flowchart 300 for improvements in cooperative text recommendation acceptance of completion options in a UI, according to an example embodiment. Completion manager 208 may operate according to flowchart 300, in an embodiment. Further structural and operational examples will be apparent to persons skilled in the relevant art(s) based on the following description. Flowchart 300 is described as follows with respect to system 200 of FIG. 2.

Flowchart 300 begins at step 302. In step 302, a first portion of a first input submitted by a user via a user interface (UI) is received. For example, input buffer 210 may be configured to receive inputs generated by a user from one or more input interfaces of I/O interface(s) 222. Inputs may be stored by input buffer 210 in memory 206 using a searchable data structure, as described herein, and may be provided to other components of completion manager 208. In embodiments, input buffer 210 may provide portions of inputs to error detector 214 and/or to pattern engine 212 as the portions are generated by the user. Inputs may be stored in whole, in parts as portions thereof are received, by input buffer 210 in memory 206. Additionally, input buffer 210 may provide inputs, or portions, to output manager 216 for display via UI(s) 218 as they are received.

In step 304, a statistical probability for a plurality of completion options of the first input is generated based at least on the first portion of the first input. For instance, pattern engine 210 may be configured to generate respective probabilities for each of a number of possible completion options determined based on the portion of the input generated by the user, prior inputs stored by input buffer 210, and/or a language model of the user. In embodiments, the context of the prior inputs, an application associated with the UI, etc., as noted above, may be used to determine the statistical probabilities. Further detail regarding pattern engine 212 and step 316 are provided below.

In step 306, one completion option of the plurality of completion options is selected based at least on its statistical probability. For example, pattern engine 212 may be configured to select one of the completion options of step 304 based on its statistical probability be higher, or the highest, with respect to the other possible completions options of the plurality of completion options.

In step 308, the selected completion option is caused to be displayed to the user via the UI with a characteristic that is different from the first portion of the first input. For instance, output manager 216 may be configured to cause selected completion option to be displayed via UI(s) 218. In embodiments, output manager 216 may receive the selected completion option from pattern engine 212 based on the performance of step 306. Output manager 216 may cause completion options to be displayed with a characteristic that is different than the user-entered input, such as being highlighted in a color, underlined, bolded, italicized, in a different font, with different opacity, and/or the like, alone or in any combination thereof. Output manager 216 may also cause completion options to be displayed adjacent to user-entered portions of inputs such that the completion options appear to complete the inputs.

As a non-limiting, illustrative example, if a user desires to type "I just wanted to follow up with you" and has provided a portion of this input ("I jus") via a keyboard, which is then displayed to the user via UI(s) 218, output manager 216 may cause a selected completion option of "t wanted to follow up" (as determined by pattern engine 212 in step 306) to be displayed next to the user-entered portion such that "I just wanted to follow up" is displayed to the user. In this example, the italicized and bolded portion is the recommended completion option selected in step 306.

From step 308, flowchart 300 may proceed to step 310, or to step 314, in embodiments. In step 310, acceptance commands may be generated based on subsequent user input for a space character, and in step 314, acceptance commands may be generated based on subsequent user input for next words, or portions thereof, to follow the selected completion option. System 200 may be configured to operate according to either option, and may be configured to dynamically utilize options based on typing speeds of users (e.g., use a space character for slower typists or use following word input for faster typists, and/or the like.

In step 310, an acceptance command for the selected completion option is generated based on a second portion of a second input generated by the user via the UI, and received by the input buffer, that represents an alphanumeric character or a space character. For example, pattern engine 212 may also be configured to generate acceptance commands based on user inputs subsequent to the selection and display of completion options described above. In embodiments, subsequent user inputs that may trigger generation of an acceptance command may be alphanumeric characters or a space character. Embodiments herein may exclude a tab character delimiter from triggering acceptance commands generation.

Continuing further with the non-limiting, illustrative example from step 308, the selected completion option of "t wanted to follow up" is provided next to the user-entered portion such that "I just wanted to follow up" is displayed to the user as the user enters their input. Once the recommended completion option is displayed, the user may enter further input such as a space character or any other designated alphanumeric characters after "jus" in the middle of the intended input portion "just" to indicate they wish to accept the completion option recommended by pattern engine 212.

Pattern engine 212 may be configured to determine whether the user wishes to continue the collaboration and accept the completion option based on the subsequent input, or if the user desires to enter their own text and disregard the completion option provided. If it is determined that the user accepts the recommended completion option, pattern engine 212 is configured to generate an acceptance command and provide the acceptance command to output manager 216. Further details regarding pattern engine 212 are provided below.

In step 312, the selected completion option is accepted based on the acceptance command. For instance, output manager 216 may also be configured to show acceptance of completion options based on acceptance commands generated by pattern engine 212 in step 310 by causing the display of the completion options, or portions thereof, to match the characteristics of the user-entered input. Continuing further with the non-limiting, illustrative example from step 308 and step 310, acceptance of the completion option "t wanted to follow up" via output manager 216, based on a command initiated by a space character, causes "I just wanted to follow up " (e.g., having a space after the word "up" in embodiments) to be displayed in uniform text. Accordingly, the user is enabled to continue typing the next input, e.g., "with you" and the completion option is accepted.

As noted above, step 314 may follow step 308, according to embodiments.

In step 314, a second portion of a second input generated by the user via the UI is stored in the data structure of the input buffer subsequent to said causing. For example, input buffer 210 may be configured to receive subsequent inputs generated by a user after the selected completion option is displayed (e.g., in step 308) from one or more input interfaces of I/O interface(s) 222. Inputs may be stored by input buffer 210 in memory 206 using a searchable data structure, as described herein, and may be provided to other components of completion manager 208. In embodiments, input buffer 210 may provide portions of subsequent inputs to pattern engine 212 as the subsequent portions are generated by the user. The subsequent inputs may include words or the like, or characters thereof, that the user intends as a continuation of the selected completion option of step 306.

Inputs may be stored in whole, in parts as portions thereof are received, by input buffer 210 in memory 206. Additionally, input buffer 210 may provide inputs, or portions, to output manager 216 for display via UI(s) 218 as they are received. It should be noted that in embodiments, output manager 216 may delay display of such subsequent inputs until the completion of step 316 described below.

In step 316, it is determined that the second portion of the second input has a second statistical probability of following the selected completion option that exceeds a statistical probability threshold value. For instance, pattern engine 212 may receive the subsequent input from input buffer 210 as described in step 314 and determine a statistical probability that the subsequent input is a continuation of the selected completion option.

Continuing further with the non-limiting, illustrative example from step 308, the selected completion option of "t wanted to follow up" is provided next to the user-entered portion such that "I just wanted to follow up" is displayed to the user as the user enters their input. Once the recommended completion option is displayed, the user may enter further input such as any characters of the word "with" after the already input text "jus" in the middle of the intended input portion "just" to indicate they wish to accept the completion option recommended by pattern engine 212 via continuation.

Pattern engine 212 may be configured to calculate the second statistical probability associated with the subsequent input following the selected completion option to determine if the subsequent user input should follow. In embodiments, a threshold value may be compared to the second statistical probability to determine whether acceptance is intended based on the subsequent user input being a possible match to continuation possibilities for the completion option. In embodiments, the threshold value may be set in the system, may be adjustable by the user, and/or may be dynamically altered by the system based on numbers of characters in the subsequent input, user language models, frequency of accepted and/or corrected completion option recommendations, prior inputs stored by input buffer 210, and/or the like. As an example, phrases frequently used or accepted by the user may require a lower threshold value. Further detail regarding pattern engine 212 and step 316 are provided below.

In step 318, an acceptance command for the selected completion option is generated based at least on the second statistical probability exceeding the statistical probability threshold value. For example, pattern engine 212 may be configured to determine the acceptance of the selected completion option recommended in flowchart 300 if the second statistical probability exceeds, or meets, the threshold value. Pattern engine 212 may provide the acceptance command to output manager 216 for step 312.

As noted above, from step 318, flowchart 300 may proceed to step 312. Proceeding from step 318, the acceptance command received by output manager 216 may be based on step 318, rather than step 310 previously described.

For instance, in step 312 proceeding from step 318, the selected completion option is accepted based on the acceptance command. In this scenario, output manager 216 may also be configured to show acceptance of completion options based on acceptance commands generated by pattern engine 212 in step 318 by causing the display of the completion options, or portions thereof, to match the characteristics of the user-entered input for a continuation of the collaboration via entry of a next word, or the like, to follow the selected completion option, rather than a space character. Continuing further with the non-limiting, illustrative example from step 308 and step 316, acceptance of the completion option "t wanted to follow up" via output manager 216, based on the command initiated by a character(s) indicative of input to follow the completion command, e.g., one or more characters of the word "with" such as the character 'w', causes "I just wanted to follow up w" (or ". . . with" or the like) to be displayed in uniform text. In this scenario, the user is enabled to continue typing the next input, e.g., "with you" where some portion of the word "with" is already provided via the UI and the completion option is accepted.

By allowing such a collaboration for the user to indicate acceptance of completion options through cooperative text recommendations, entry of inputs is more efficiently performed and displayed via the UI enabling users to type more quickly.

Figure 4:
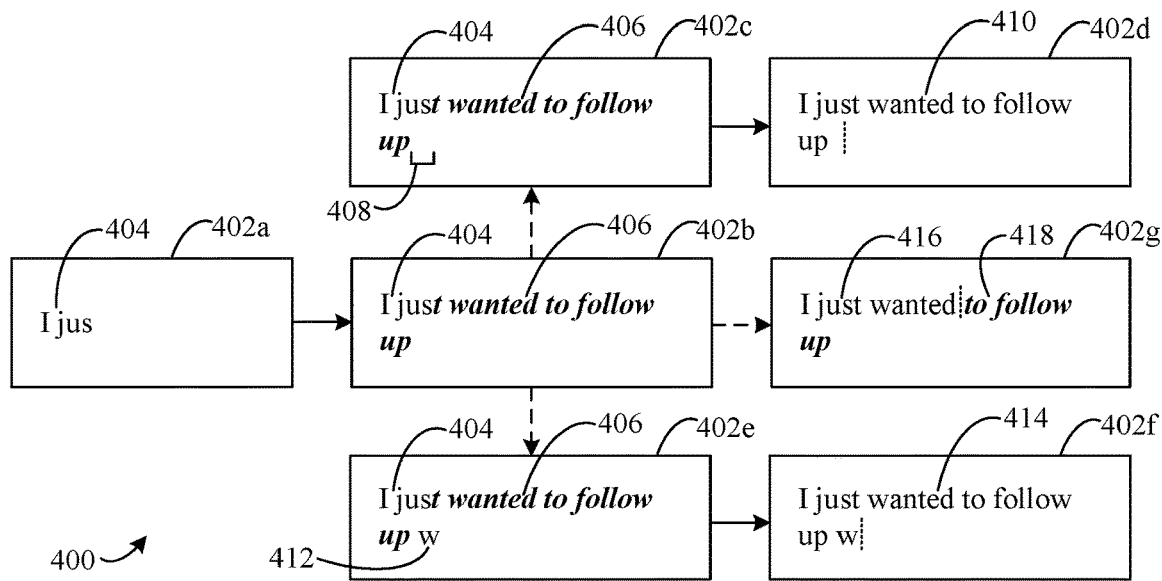
FIG. 4 shows a flow diagram for cooperative text recommendation acceptance in a UI, in accordance with an embodiment.

Referring now to FIG. 4, a flow diagram 400 for cooperative text recommendation acceptance in a UI is shown, according to an example embodiment. Flow diagram 400 may be an embodiment of flowchart 300 of FIG. 3. Completion manager 208 may operate according to flow diagram 400, in an embodiment. Further structural and operational examples will be apparent to persons skilled in the relevant art(s) based on the following description. Flow diagram 400 is described as follows with respect to system 200 of FIG. 2 and flowchart 300 of FIG. 3.

Flow diagram 400 includes a number of representations of a UI that may be embodiments of UI(s) 218: UI 402a, UI 402b, UI 402c, UI 402d, UI 402e, UI 402f, and UI 402g, each of which display inputs provided by users and selected completion options generated by completion manager 208 of system 200 through the progression of flow diagram 400. As shown, a user may provide a first input 404 displayed through UI 400a, via one or more input devices, as described herein. For example, using a keyboard, first input 404 is provided and received by input buffer 210 as described in flowchart 300. First input 404 is displayed via UI 402a and is illustrated as a first portion of first input 404 with the text "I jus" as similarly described in examples above where the user desires to input "I just wanted to follow up with you . . . ." Pattern engine 212 may be provided with the first portion "I jus" of first input 404 from input buffer 210 to determine a completion option for first input 404.

Figure 5:
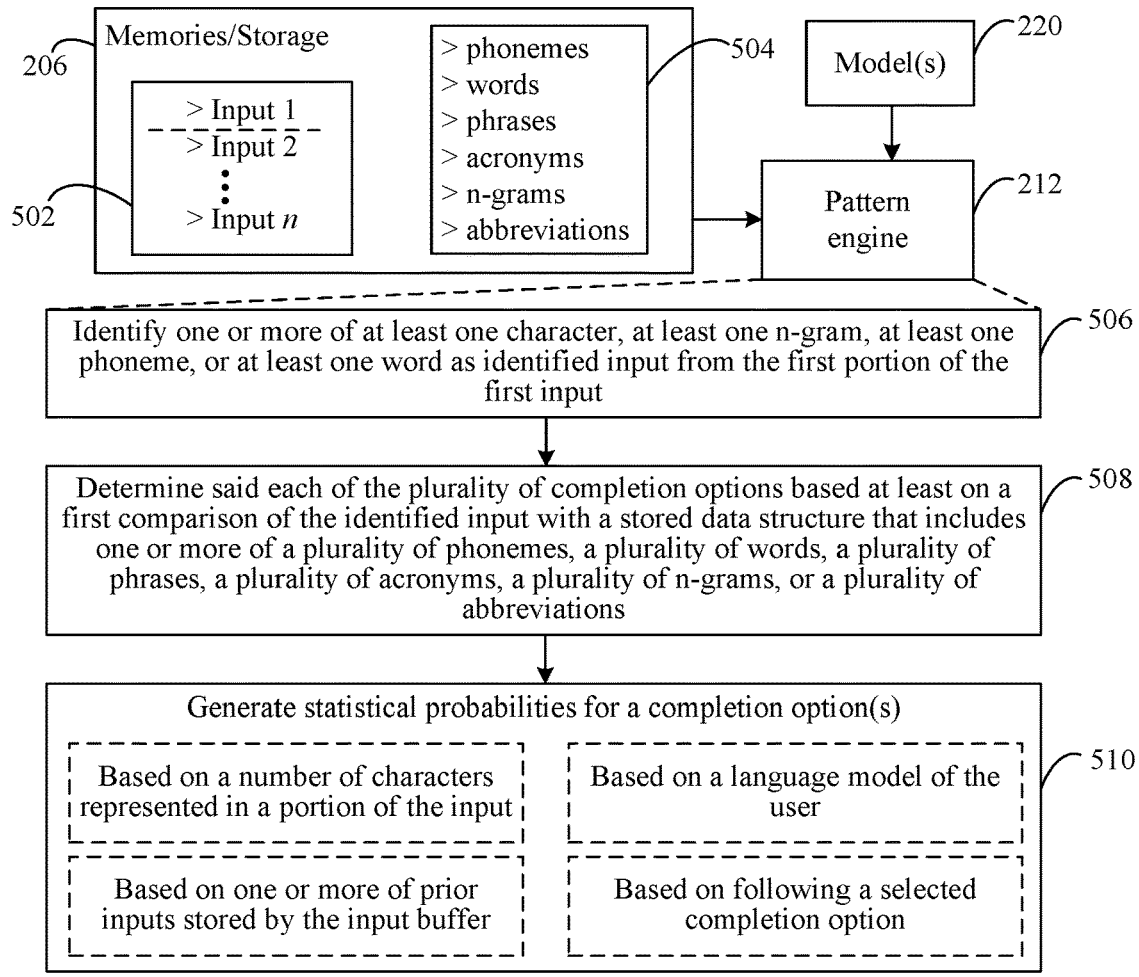
FIG. 5 shows a flow diagram for cooperative text recommendation acceptance in a UI, in accordance with an example embodiment.

For example, a plurality of completion options may be determined by pattern engine 212 based on the first portion, further details of which are described below with respect to FIG. 5. Based on the text "I jus" provided by the user, pattern engine 212 may determine possible completion options as "I just called to say . . . ," "I just got home . . . ," "I just wanted to follow up . . . ," "I just left the store . . . ," and/or the like. Pattern engine 212 may select one of the plurality of possible completion options based on the portion of first input 404 generated by the user, prior inputs stored by input buffer 210, and/or a language model of the user (e.g., one of model(s)

220, as similarly described in flowchart 300, as well as context information, in embodiments.

As an example, if UI 402a is associated with an electronic mail ("email") application in which the user is responding to a question in a prior email from another user, and a language model of the user indicates frequent use of "I just wanted to follow up" in user-generated replies, it may be statistically probable, via calculation, that a corresponding completion option should be selected: "t wanted to follow up".

Accordingly, pattern engine 212 may provide such a completion option 406 to output manager 216 which causes completion option 406 to be displayed in UI 402b as shown with a differentiating characteristic with respect to the first portion of first input 404. Upon seeing completion option 406 displayed in UI 402b, the user may take various actions to accept or ignore completion option 406.

For instance, UI 402c shows completion option 406 displayed in UI 402b with the first portion of first input 404 to which the user has entered a second portion of a second input 408. The second portion of second input 408 corresponds to a space character and is caused to be displayed after completion option 406, not after "I jus", as pattern engine 212 may determine that second input 408 is intended as an acceptance of completion option 406, e.g., second input 408 is provided in the middle of what would be the word "just" and does not match input from the user corresponding to the completion option 406. Thus, in UI 402d, an accepted completion 410 is shown with completion option 406 being accepted, having the same display characteristics as used for first input 404, and the cursor of UI 402d being after accepted completion 410 (with or without a space in embodiments).

In another example, UI 402e is shown with completion option 406 displayed in UI 402b with the first portion of first input 404 to which the user has entered a second portion of a second input 412. The second portion of second input 412 corresponds to the letter 'w' and is caused to be displayed after completion option 406, not after "I jus", as pattern engine 212 may determine that second input 412 is intended as an acceptance of completion option 406, e.g., second input 412 is provided in the middle of what would be the word "just," does not match input from the user corresponding to the completion option 406, and does match a possible continuation of completion option 406, e.g., "with" or "with you." Thus, in UI 402f, an accepted completion 414 is shown with completion option 406 being accepted, having the same display characteristics as used for first input 404, and the cursor of UI 402f being displayed after the 'w'.

In still another example, UI 402g is shown with completion option 406 being altered as a completion option 418 that represents a portion or part of completion option 406. For instance, if the user follows the first portion of first input 404 with additional user-provided input "t wanted" (as entered input 416) with the cursor at a position after "wanted," the remaining portion of completion option 406 is maintained as completion option 418 because the additional entered input 416 matches the first part of completion option 406. In UI 402g, the user may still enter inputs indicating acceptance of the remaining completion option 418 as similarly described for UI 402c and/or UI 402e.

As noted above, possible completion options for user inputs may be determined by pattern engine 212 of system 200 in FIG. 2. Pattern engine 212 may determine such possible completion options based on comparisons of the current user input with matching information and prior user inputs.

For instance, FIG. 5 will now be described with reference to system 200 of FIG. 2. FIG. 5 shows a flow diagram 500 for cooperative text recommendation acceptance of completion options in a UI, in accordance with an example embodiment. In the embodiment described, pattern engine 212 of system 200 is shown as receiving inputs from memory 206 and model(s) 220 to determine a plurality of possible completion options, as described herein.

For example, pattern engine 212 may utilize a user language model of model(s) 220 and/or a ML-generated completion model as part of determining possible completion options. Pattern engine 212 may also utilize inputs 502 made by a user and stored in memory 206 in conjunction with input buffer 210. As shown, a current input "Input 1" and a number prior inputs ("Input 2" through "Input n") depending on the size of input buffer 210 may be used for context and/or the like by pattern engine 212. Additionally, a data structure 504 including phonemes, words, phrases, acronyms, n-grams, and/or abbreviations, in embodiments, may be utilized by pattern engine 212 to determine possible completion options. Relationships between items included in data structure 504 may link words, phrases, etc., with associated phonemes, words, n-grams, etc., that may be used to determine a given, possible completion option.

Pattern engine 212 may receive the current input "Input 1" from memory directly, or via input buffer 210, to begin the determination for possible completion options. For instance, pattern engine 212 may be configured to identify one or more of at least one character, at least one n-gram, at least one phoneme, or at least one word as identified input from the first portion of the first input, as in step 506. That is, pattern engine may identify structural characteristics of inputs and input portions as identified inputs in order to understand what the user has entered as input. These characteristics or identified inputs may be used to determine possible completion options.

Pattern engine 212 may use the identified inputs/characteristics from step 506, and in step 508, pattern engine may be configured to determine each of the plurality of completion options based at least on a first comparison of the identified input with a stored data structure that includes one or more of a plurality of phonemes, a plurality of words, a plurality of phrases, a plurality of acronyms, a plurality of n-grams, or a plurality of abbreviations. That is, pattern engine may compare, or look up, the identified inputs against the information stored in data structure 504. As one example, identified inputs from step 506 may be matched in data structure 504, and such matches may be linked in data structure 504 to words, phrases, acronyms, abbreviations, and/or the like, therein.

Having determined the plurality of possible completion options, each may be processed by pattern engine 212 to generate their respective statistical probabilities in step 510. Statistical probabilities may be generated by pattern engine 212 based on inputs 502 stored by input buffer 210 in memory 206, a language model(s) of the user stored as model(s) 220, a number of characters provided in a portion of entered input "Input 1," context information, and/or the like.

For example, with respect to the number of characters provided in a portion of entered input "Input 1," a higher statistical probability may be generated when the user has provided five characters as input, while two characters provided may result in a lower probability due to due to less certainty, or more possibilities, for completion option candidates. Context information may be based, without limitation, on one or more of semantics of the content, a type of application related to the content, other users associated with an application for a UI, other information presented in the UI, keywords, language models, etc.

In some embodiments, a completion option of the plurality of possible completion options may be selected based on having a high, or the highest, statistical probability with respect to other ones of the plurality of possible completion options.

Figure 6:
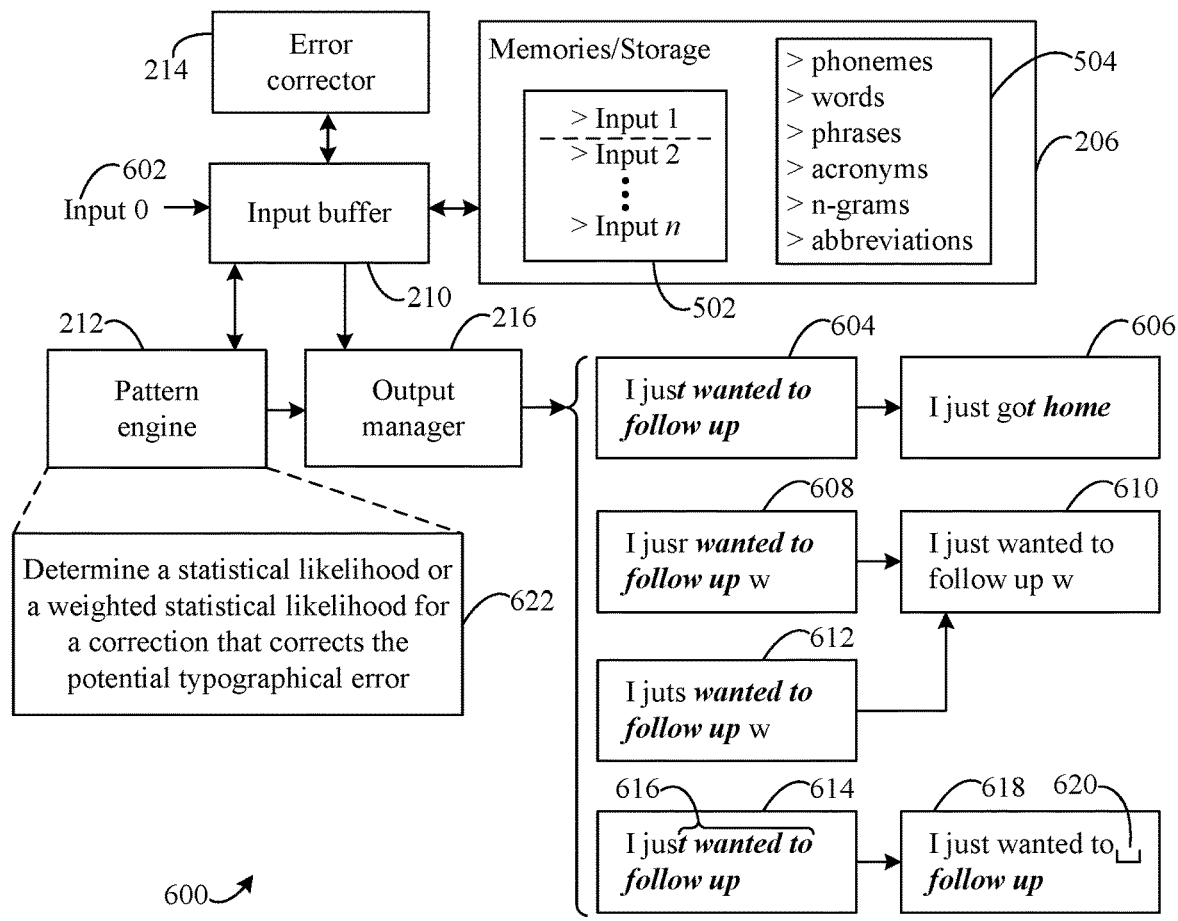
FIG. 6 shows a block diagram of a system for cooperative text recommendation acceptance in a UI, in accordance with an example embodiment.

FIG. 6 shows a block diagram of a system 600 for cooperative text recommendation acceptance of completion options in a UI, in accordance with an example embodiment. System 600 may be an embodiment of system 200 of FIG. 2. In the embodiment described, input buffer 210, pattern engine 212, error corrector 214, and output manager 216 of system 200 are shown, along with memory 206. As shown, memory 206 includes inputs 502, made by a user and stored in memory 206 in conjunction with input buffer 210, and data structure 504, each of which are described above with respect to FIG. 5. System 600 may be configured for determining corrections and alterations for completion options, as described herein.

For example, in system 600, a first portion of a first user input ("Input 1") may be received by input buffer 210 and stored in memory 206 as part of inputs 502. The first portion of the first input may also be provided from input buffer 210 to output manager 216 for display to the user (exemplarily shown in a display 604 as "I jus" in keeping with the examples provided above for continuity of description). As also previously described, pattern engine 212 may determine a completion option to recommend to the user (exemplarily shown in display 604 as "t wanted to follow up"). It has been described herein that parts of completion options may be maintained for display to the user as the user continues to enter the first input as long as the user's entered input matches the completion option displayed.

However, as shown in system 600, pattern engine 212 may be configured to change the recommended completion option when additional user input for the first input does not match the completion option. For instance, if the users continues to enter the first input as "I just go", where "go" does not match "wa" in the completion option recommended, pattern engine 212 may indicate the difference to output manager 216 causing the completion option to be removed and/or be replaced by a different completion option newly determined by pattern engine 212. This scenario is shown in a display 606 where based on the first input entered by the user, a new completion option "t home" is caused to be displayed by output manager 216 as similarly performed for the prior completion option in display 604.

A display 608 shows another scenario in which the user has included an error based on key proximity on the user's keyboard. Here, the user has entered "I jusr" instead of "I just" (i.e., the key for the character 'r' is adjacent to the key for the character 't'). In embodiments, as noted herein, error corrector 214 may be configured to monitor user inputs and identify or determine possible errors therein, as well as possible errors in prior inputs stored in input buffer 210. Additionally, error corrector 214 may be configured to determine possible corrections for selected completion options and/or prior inputs based on subsequent inputs where potential errors may include, without limitation, typographical errors such as transposed characters, adjacent key presses, multiple key presses, misspellings by the user, and/or the like, in embodiments. Here, error corrector 214 may identify the user's error as an adjacent key press, determine a possible correction(s) (e.g., "just"), and indicated such identification and correction to pattern engine 212. Likewise, pattern engine 212 may be configured to account for such errors and determine a statistical likelihood or a weighted statistical likelihood for a correction that corrects the potential typographical error, e.g., the possible correction identified by error corrector 214, as shown in operation 622.

In embodiments a weighted statistical likelihood may be used in which one or more factors are treated as having a greater impact on the statistical likelihood calculated for the correction.

If pattern engine 212 determines that the statistical likelihood is high enough (e.g., according to a threshold, or the like), a completion option may be determined/selected under the assumption that the correction is right. In this scenario, "jusr" will be considered as if the user meant to enter "just" and a completion option to recommend to the user is displayed (exemplarily shown in display 608 as "wanted to follow up"). Also shown in display 608, the user next enters a 'w' which pattern engine 212 determines is an acceptance of the completion option, causing the acceptance to be reflected in a display 610 along with the correction for the error "jusr" to "just" from the user's original first input.

A display 612 shows still another scenario in which the user has included an error based on letter juxtaposition or transposal. Here, the user has entered "I juts" instead of "I just" (i.e., the character 's' is transposed with the character 't'). Error corrector 214 may be configured to monitor the user inputs and identify or determine this possible error based on the improper use of "juts" with "I" even though "juts" is a properly spelled word on its own. Again, an indication of the possible error and its possible correction may be provided by error corrector 214 to pattern engine 212 for a determination according to operation 622 for the possible correction.

If pattern engine 212 determines that the statistical likelihood is high enough (e.g., according to a threshold, or the like), a completion option may be determined/selected under the assumption that the correction is right. In this scenario, "juts" will be considered as if the user meant to enter "just" and a completion option to recommend to the user is displayed (exemplarily shown in display 612 as "wanted to follow up"). Also shown in display 608, the user next enters a 'w' which pattern engine 212 determines is an acceptance of the completion option, causing the acceptance to be reflected as shown again in a display 610, in this case with the correction for the error "juts" to "just" from the user's original first input.

A display 614 shows yet another scenario in which the user is presented with a completion option similar to that in display 604. In this case, the completion option shown in display 614 ("t wanted to follow up") may have a length that exceeds a length threshold 616. Length threshold 616 may be set for the system, may be configurable by a user, and/or may be dynamically configurable by the system based on certainty factors such as a number of characters in the first input of the user, a number of corrections made by the user to recommended completion options, a statistical probability for the completion option, statistical probabilities of other predicted completions, including in some embodiments their aggregate probability, a number of possible words or phrases that could be substituted into the end of the completion option, etc., as described herein. Length threshold 616 may have a value with units of letters, words, etc., and is exemplarily shown as including the next two whole words for a given completion option.

For instance, the user may desire to type "I just wanted to thank you" but the statistical probability of "I just wanted to follow up with you" may be slightly higher. Thus, there is some uncertainty for the end of the completion option. Here, the selected completion option ("t wanted to follow up") is displayed, but because of the uncertainty, the length threshold is utilized by pattern engine 212 such that only part of the completion option is initially accepted as shown in a display 618. The acceptance may be triggered by, e.g., a space character 620, and the remaining portion of the selected completion option (i.e., "follow up") is maintained for further acceptance by the user, or the user may enter a different additional input and ignore it, via a subsequent input 602 ("Input 0").

Figure 7:
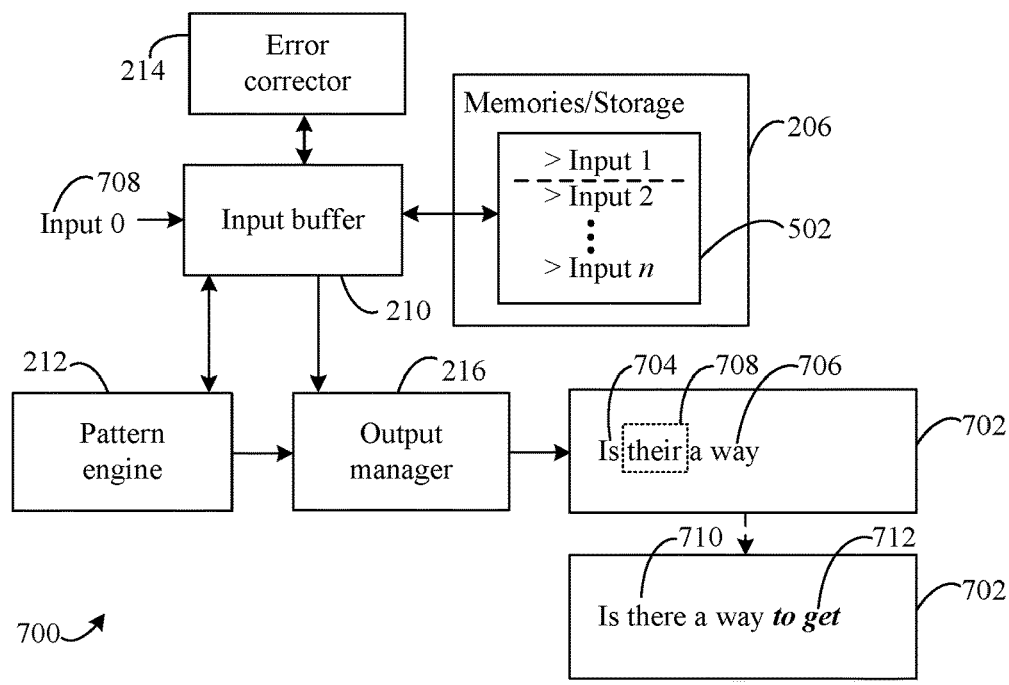
FIG. 7 shows a block diagram of a system for cooperative text recommendation acceptance in a UI, in accordance with an example embodiment.

Continuing now to FIG. 7, a block diagram of a system 700 for cooperative text recommendation acceptance of completion options in a UI is shown, in accordance with an example embodiment. System 700 may be an embodiment of system 200 of FIG. 2 and/or system 600 of FIG. 6. In the embodiment described, input buffer 210, pattern engine 212, error corrector 214, and output manager 216 of system 200 are shown, along with memory 206. As shown, memory 206 includes inputs 502, made by a user and stored in memory 206 in conjunction with input buffer 210, which is described above with respect to FIG. 5. System 700 may be configured for determining corrections and alterations for completion options, as described herein.

For example, in system 700, input buffer 210 receives user inputs, pattern engine 212 determines and selects completion options, and output manager 216 causes the completion options to be displayed, as described herein, via a display 702. In the embodiment illustrated for system 700, "Input 2" of inputs 502 may correspond to the first two words of text, an input 704, from the user ("Is their") in display 702, and "Input 1" of inputs 502 may correspond to the second two words of text, an input 706, from the user ("a way") in display 702.

Error corrector 214 may monitor user inputs for possible errors, as described herein.

In the embodiment shown, the user may enter input 704 which includes an error "their" instead of "there" that may not initially be detectable by the system. Thus, pattern generator 212 is unlikely to recommend completion options that would be useful to the user. The error in input 704 becomes apparent, and may be identified by error corrector 214, after the user continues entry on their own with input 706 because "Is their" does not properly form a phrase with "a way" which may be caught by error corrector 214. However, in some cases there may not be enough certainty based on a statistical likelihood calculated by pattern generator 212 to determine a completion option due to the error "their".

Accordingly, output manager 216 may be configured to highlight via the UI (e.g., display 702) a region of uncertainty 708 related to the potential typographical error in the first portion of the first input or the one or more prior inputs (e.g., input 704, "Input 2" of inputs 504) stored by input buffer 210 in memory 206. The highlighted region of uncertainty 708 may prompt the user to correct the error, after which, a user-corrected input 710 is present in display 702. Pattern engine 212 may be configured to determine a completion option 712 ("to get") that is caused to be displayed to the user in display 702 for acceptance with a next input 708 ("Input 0"), or to be ignored.

Embodiments herein, as noted above, also provide for the ability to generate statistical probabilities, e.g., for each of a plurality of completion options determined by a pattern engine based on a number of characters that are represented in a portion of the input entered by the user. Additional embodiments for tracking corrections and acceptances of completion options are provided below for FIG. 8 and FIG. 9.

Figure 8:
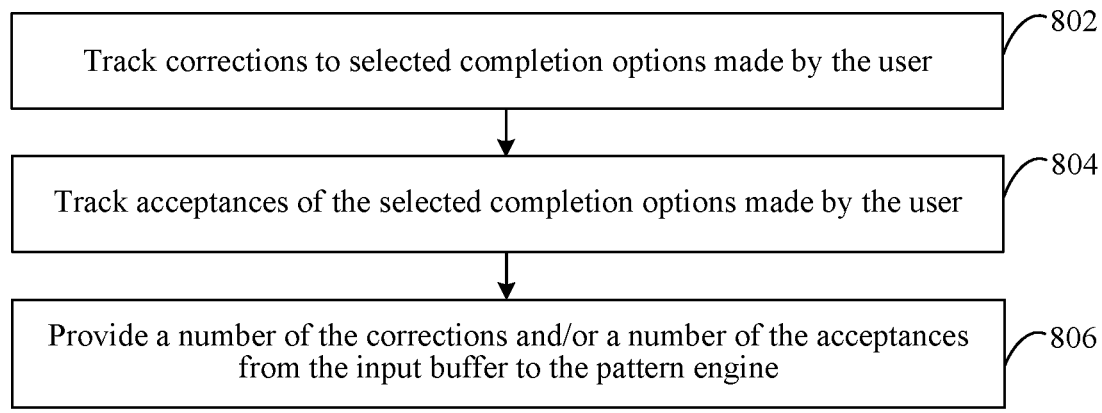
FIG. 8 shows a flowchart for cooperative text recommendation acceptance in a UI, in accordance with an example embodiment.
Figure 9:
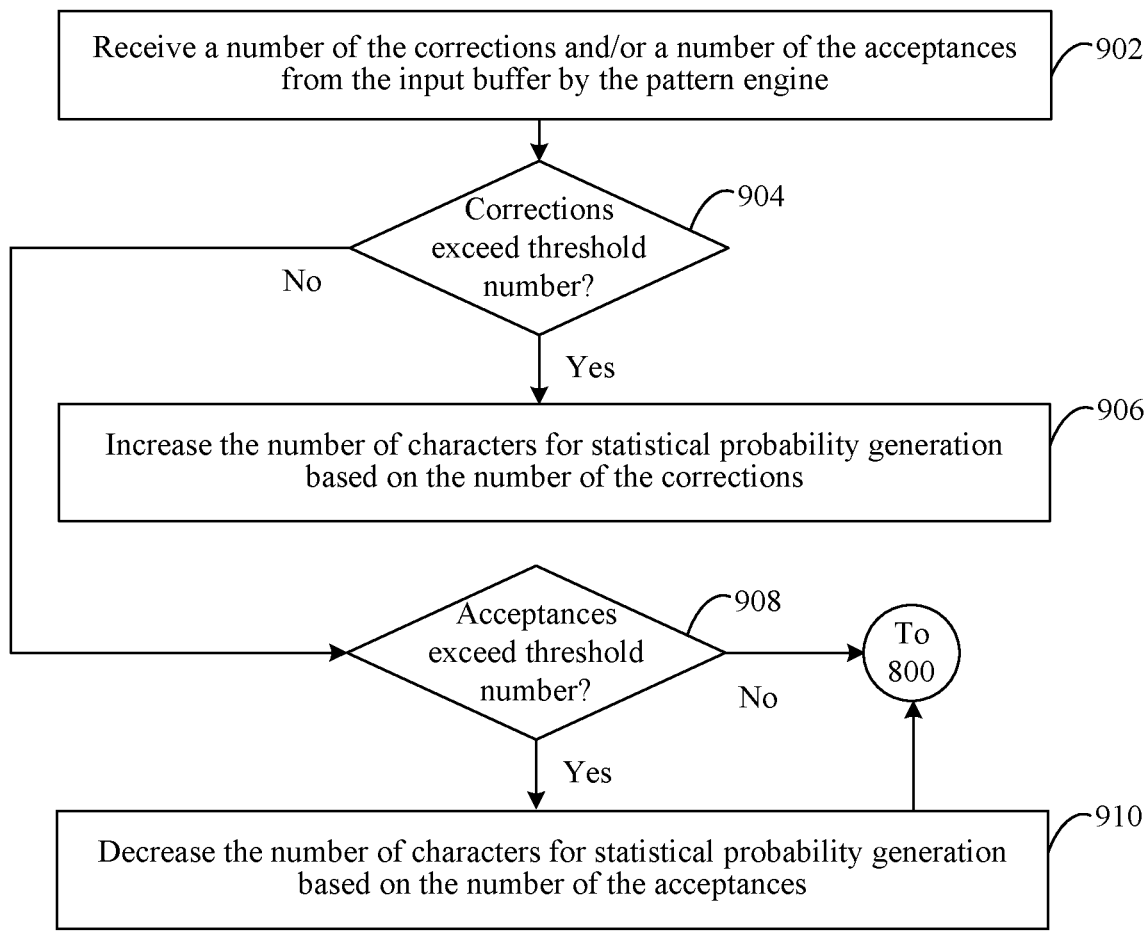
FIG. 9 shows a flowchart for cooperative text recommendation acceptance in a UI, in accordance with an example embodiment.

FIG. 8 and FIG. 9 are described as follows. FIG. 8 shows a flowchart 800 for cooperative text recommendation acceptance of completion options in a UI, according to an example embodiment. Flowchart 800 may be a further embodiment of flowchart 300 of FIG. 3, and/or of one or more flow diagrams described herein. FIG. 9 shows a flowchart 900 for cooperative text recommendation acceptance of completion options in a UI, according to an example embodiment. Flowchart 900 may be an embodiment of flowchart 300 of FIG. 3, and/or of one or more flow diagrams described herein. Flowchart 800 and flowchart 900 may be performed by system 200 of FIG. 2, e.g., by input buffer 210 and pattern engine 212, respectively. Further structural and operational examples will be apparent to persons skilled in the relevant art(s) based on the following description. Flowchart 800 is described as follows.

Flowchart 800 begins at step 802. In step 802, corrections to selected completion options made by the user are tracked. For instance, input buffer 210 may be configured to track a number of times a user makes a correction to, or changes, a selected completion option that has been accepted in a UI. In embodiments, corrections to selected completion options may include a number of times the user ignores selected completion options when provided via the UI. Additionally, automatic corrections subsequently made to selected completion options by pattern engine 212 and/or error corrector 214 may be tracked.

In step 804, acceptances of the selected completions made by the user are tracked. For example, input buffer 210 may be configured to track a number of times a user accepts a selected completion option that has been provided to the user via a UI, without subsequent correction. In embodiments, acceptances of completion options may include a number of times the user accepts a selected completion options by any type of acceptance described herein.

In step 806, a number of the corrections and/or a number of the acceptances are provided from the input buffer to the pattern engine. For instance, input buffer 210 may be configured to provide the tracked number of corrections and/or the tracked number of acceptances to pattern engine 212. In embodiments, counters for tracking the number of corrections and/or the number of acceptances may be reset after provision to pattern engine 212, while in other embodiments the counters may cumulatively track these statistics.

Referring again to FIG. 9, flowchart 900 begins at step 902, which may follow step 806 of flowchart 800.

In step 902, a number of the corrections and/or a number of the acceptances are received from the input buffer by the pattern engine. For instance, pattern engine 212 may be configured to receive a number of the corrections and/or a number of the acceptances from input buffer 210.

In step 904, it is determined if the corrections exceed a threshold number. For example, a corrections threshold value may be stored in memory 206, and pattern engine 212 may compare the received number of the corrections to the corrections threshold value. The corrections threshold value may set for the system, or may be dynamically determined, in embodiments. If the corrections threshold is exceeded, or met in embodiments, flowchart 900 continues to step 906; if not, flowchart 900 continues to step 908.

In step 906, the number of characters for statistical probability generation is increased based on the number of the corrections. For instance, pattern engine 212 may be configured to increase the number of characters utilized for generating statistical probabilities, as described herein, according to the number corrections exceeding, or meeting, the corrections threshold. In other words, the corrections threshold may be an indication that determined and/or selected completion options are not useful to the user or are not accurate enough to increase the efficiency of input provision via the UI. Accordingly, increasing the number of characters needed to generate statistical probabilities allows for pattern engine 212 to determine and/or select completion options with a higher certainty of correctness. Put another way, pattern engine 212 will be more conservative, or less aggressive, in selecting completion options, i.e., waiting for additional user input before making selections.

In step 908, it is determined if acceptances exceed a threshold number. For example, an acceptance corrections threshold value may be stored in memory 206, and pattern engine 212 may compare the received number of the acceptances to the acceptance threshold value. The acceptance threshold value may set for the system, or may be dynamically determined, in embodiments. If the acceptance threshold is exceeded, or met in embodiments, flowchart 900 continues to step 910; if not, flowchart 900 may continue to flowchart 800 where tracking is continued.

In step 910, the number of characters for statistical probability generation are decreased based on the number of the acceptances. For instance, pattern engine 212 may be configured to decrease the number of characters utilized for generating statistical probabilities, as described herein, according to the number of acceptances exceeding, or meeting, the acceptance threshold. In other words, the acceptance threshold may be an indication that determined and/or selected completion options are useful to the user or are accurate enough to increase the efficiency of input provision via the UI. Accordingly, decreasing the number of characters needed to generate statistical probabilities allows for pattern engine 212 to determine and/or select completion options with a possibly lower certainty of correctness, but to do so more quickly. Put another way, pattern engine 212 will be less conservative, or more aggressive, in selecting completion options, i.e., without waiting for additional user input before making selections.

From step 910, flowchart 900 may continue to flowchart 800 where tracking is continued.

Embodiments herein also provide for the ability to provide selected completion options to a user via a UI for a set amount of time based on a timer, e.g., a completion timer of timers 226 of system 200 in FIG. 2.

Figure 10:
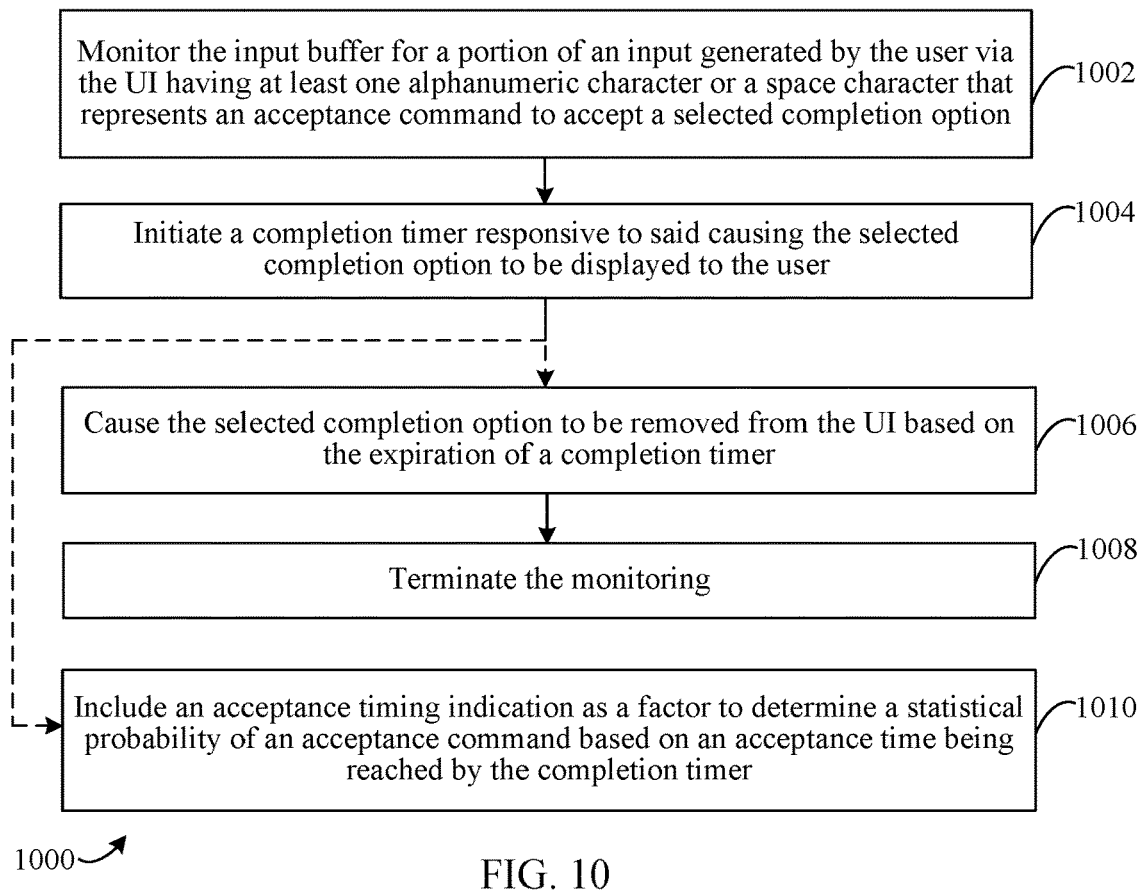
FIG. 10 shows a flowchart for cooperative text recommendation acceptance in a UI, in accordance with an example embodiment.

FIG. 10 shows a flowchart 1000 for cooperative text recommendation acceptance of completion options in a UI, according to an example embodiment. Flowchart 1000 may be a further embodiment of flowchart 300 of FIG. 3, and/or of one or more flow diagrams described herein. In an embodiment, flowchart 1000 may be performed subsequent to step 308 of flowchart 300. Flowchart 1000 may be performed by system 200 of FIG. 2. Further structural and operational examples will be apparent to persons skilled in the relevant art(s) based on the following description. Flowchart 1000 begins at step 1002 and is described as follows.

In step 1002, the input buffer is monitored for a portion of an input generated by the user via the UI having at least one alphanumeric character or a space character that represents an acceptance command to accept a selected completion option. For example, pattern engine 212 may be configured to monitor input buffer 210 for user-generated inputs having alphanumeric characters or space characters representing an acceptance command, as described herein.

In step 1004, a completion timer is initiated responsive to said causing the selected completion option to be displayed to the user. For instance, input buffer 210, pattern engine 212, or output manager 216 may be configured to initiate a completion timer based on a selected completion option being caused to be displayed to the user via the UI. In embodiments, system 200 and/or completion manager 208 may include a completion timer (e.g., one of timers 226 shown in FIG. 2) as will be understood by those of skill in the relevant arts having the benefit of this disclosure. Accordingly, the amount of time that the selected completion option is available to the user via display by the UI is determined by the completion timer.

In step 1006, the selected completion option is caused to be removed from the UI based on the expiration of a completion timer. For example, output manager 216 may be configured to cause the selected completion option to be removed from the UI when the completion timer expires.

In step 1008, the monitoring is terminated. For instance, pattern engine 212 may cease monitoring input buffer 210 for inputs representing acceptance of a selected completion option when the completion timer expires and the completion option is removed, being no longer available for acceptance by the user.

In step 1010, an acceptance timing indication is provided to the pattern engine as a factor to determine a statistical probability of an acceptance command. In embodiments, step 1010 may follow step 1004, and may be performed alternatively to step 1006 and/or step 1008. For example, based on the initializing of the completion timer in step 1004, input buffer 210, pattern engine 212, or output manager 216 may be configured to determine or to receive an indication that the completion timer has reached an acceptance value. That is, input disruptions in the timing of user input may be used as an indication (e.g., relative to the displaying of the selected completion option) that the user may have perceived the selected completion option displayed and accepted it (or intends to accept it). The acceptance value associated with the completion timer may be some amount of time (e.g., a window or period of time) set for the system that accounts for a user's perception of selected completion options. In other words, a relatively small disruption or delay in the flow of user input that corresponds to the display of a selected completion option may be treated as indicia of consideration and/or acceptance of the selected completion option by user, especially with such a disruption or delay is followed by continued user input that matches an acceptance input, as described above. In such cases, pattern engine 212 may receive the indication and determine an increase for a statistical probability of an acceptance command. It should also be noted that disruption or delay in the flow of user input may be monitored by a different timer of timers 226, in embodiments.

Embodiments herein also provide for the ability to receive input from users from a variety of input modalities.

Figure 11:
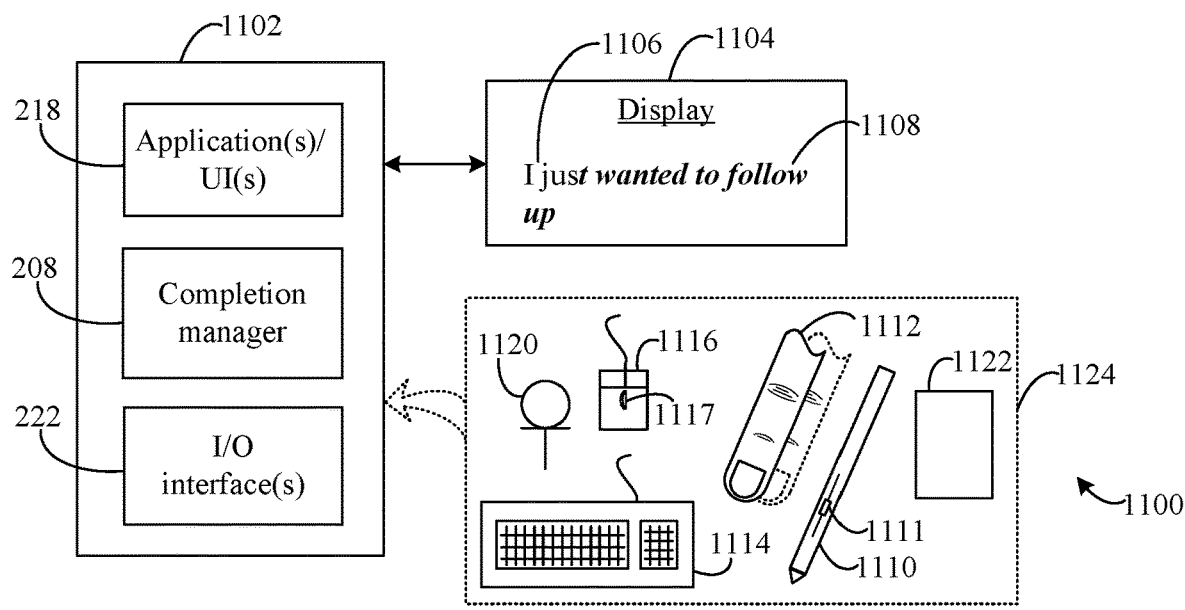
FIG. 11 shows a block diagram of a system for cooperative text recommendation acceptance in a UI, in accordance with an example embodiment.

Turning now to FIG. 11, a block diagram of a system 1100 for cooperative text recommendation acceptance of completion options in a UI, according to an example embodiment. System 1100 may be a further embodiment of system 200 of FIG. 2.

System 1100 includes a computing device 1102, which may be an embodiment of computing device 202 of FIG. 2, and may be any type of computer or computing device, as mentioned elsewhere herein, or as otherwise known. Computing device 1102 may include any components described herein with respect to computing device 202, including completion manager 208, I/O interface(s) 222, and UI(s) 218 as shown. System 1100 may also include additional components (not shown for brevity and illustrative clarity) including, but not limited to, components and subcomponents of other devices and/or systems herein, as well as those described below with respect to FIGS. 12 and 13, such as an operating system.

As shown in FIG. 11, system 1100 may also include a display 1104 configured to display UIs of UI(s) 218, e.g., of software applications, for cooperative text recommendation acceptance of completion options, described herein. For example, as shown for illustrative purposes, a selected completion option 1108 a user input 1106 may be displayed to the user via display 1104. In embodiments, display 1104 may be a part of computing device 1102 (e.g., as a screen or a touch screen) or may be an external display device.

System 1100 may also include, or have associated therewith, input devices 1124 that corresponds to ones of I/O interface(s) 222 and represent different input modalities supported by the embodiments described herein. One or more of input devices 1124 may be included in computing device 1102. Input devices 1124 may include, without limitation, a stylus, a pen, or a light pen (stylus "1110"), a keyboard 1114, a mouse 1116, a microphone 1120, a touch interface 1122, a virtual reality (VR) controller, video capture of hand and finger motions, etc. In embodiments, a user's finger(s) 1112 may be used as one of input devices 1124 (an "organic" input device, versus "non-organic" input devices that include a pen/stylus, a light pen, a keyboard, a mouse, etc.). As shown, stylus 1110 may include a button or a slider 1111, and mouse 1116 may include a wheel 1117.

The examples above in this Section are illustrative in nature only, and are not to be considered limiting. It is contemplated that variations and equivalent implementations are encompassed by the embodiments as would be understood by persons of skill in the relevant art(s) having the benefit of this disclosure.

III. Example Mobile Device and Computing Device Embodiments

Embodiments described herein may be implemented in hardware, or hardware combined with software and/or firmware. For example, embodiments described herein may be implemented as computer program code/instructions configured to be executed in one or more processors and stored in a computer readable storage medium. Alternatively, embodiments described herein may be implemented as hardware logic/electrical circuitry.

As noted herein, the embodiments described, including system 100 of FIG. 1, system 200 of FIG. 2, system 600 of FIG. 6, system 700 of FIG. 7, and system 1100 of FIG. 11, along with any components and/or subcomponents thereof, as well as the flowcharts/flow diagrams described herein, including portions thereof, and/or further examples described herein, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), or an application specific integrated circuit (ASIC). A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Embodiments described herein may be implemented in one or more computing devices similar to a mobile system and/or a computing device in stationary or mobile computer embodiments, including one or more features of mobile systems and/or computing devices described herein, as well as alternative features. The descriptions of mobile systems and computing devices provided herein are provided for purposes of illustration, and are not intended to be limiting. Embodiments may be implemented in further types of computer systems, as would be known to persons skilled in the relevant art(s).

Figure 12:
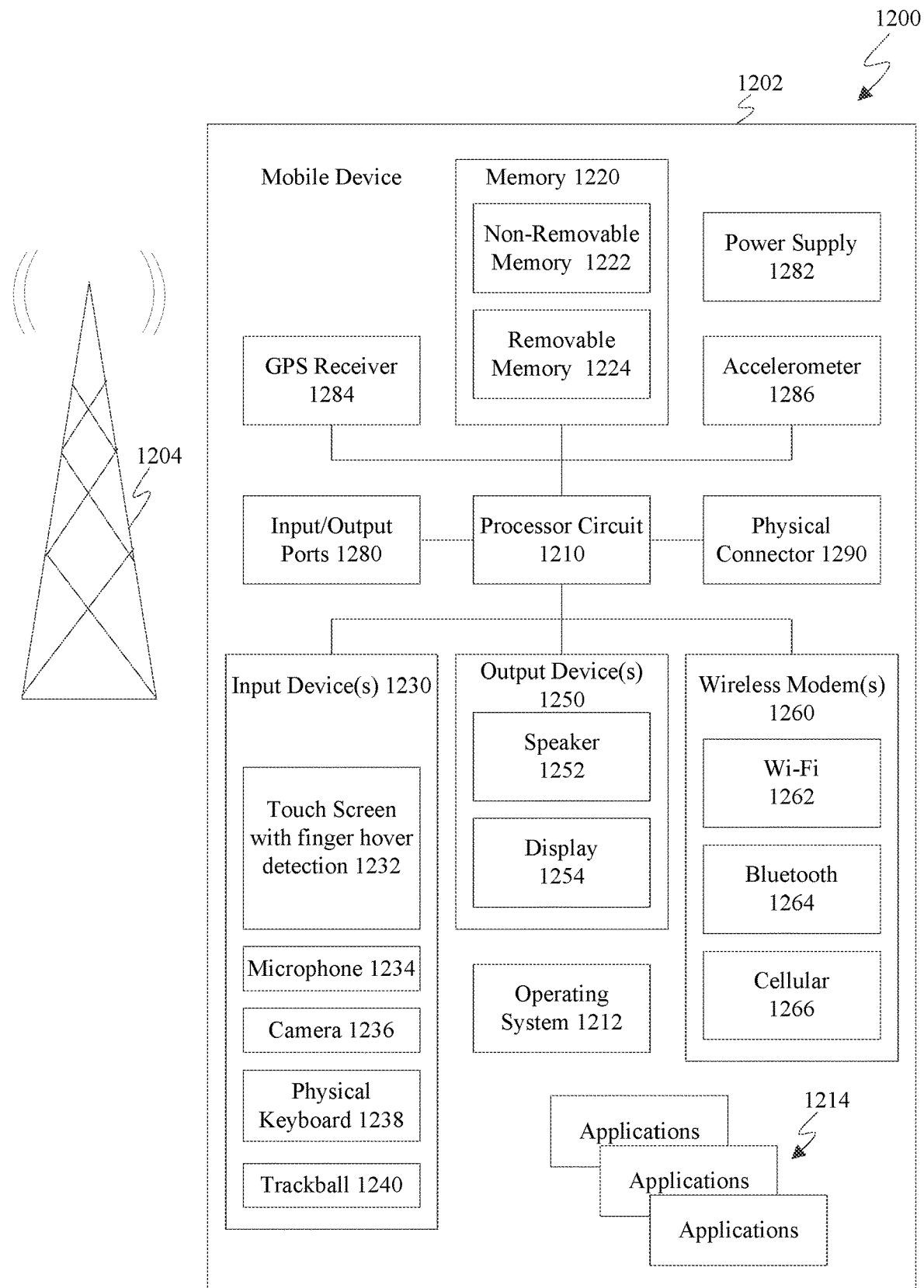
FIG. 12 shows a block diagram of an example mobile device that may be used to implement various example embodiments.

FIG. 12 is a block diagram of an exemplary mobile system 1200 that includes a mobile device 1202 that may implement embodiments described herein. For example, mobile device 1202 may be used to implement any system, client, or device, or components/subcomponents thereof, in the preceding sections. As shown in FIG. 12, mobile device 1202 includes a variety of optional hardware and software components. Any component in mobile device 1202 can communicate with any other component, although not all connections are shown for ease of illustration. Mobile device 1202 can be any of a variety of computing devices (e.g., cell phone, smart phone, handheld computer, Personal Digital Assistant (PDA), etc.) and can allow wireless two-way communications with one or more mobile communications networks 1204, such as a cellular or satellite network, or with a local area or wide area network.

Mobile device 1202 can include a controller or processor 1210 (e.g., signal processor, microprocessor, ASIC, or other control and processing logic circuitry) for performing such tasks as signal coding, data processing, input/output processing, power control, and/or other functions. An operating system 1212 can control the allocation and usage of the components of mobile device 1202 and provide support for one or more application programs 1214 (also referred to as "applications" or "apps"). Application programs 1214 may include common mobile computing applications (e.g., e-mail applications, calendars, contact managers, web browsers, messaging applications) and any other computing applications (e.g., word processing applications, mapping applications, media player applications).

Mobile device 1202 can include memory 1220. Memory 1220 can include non-removable memory 1222 and/or removable memory 1224. Non-removable memory 1222 can include RAM, ROM, flash memory, a hard disk, or other well-known memory devices or technologies. Removable memory 1224 can include flash memory or a Subscriber Identity Module (SIM) card, which is well known in GSM communication systems, or other well-known memory devices or technologies, such as "smart cards." Memory 1220 can be used for storing data and/or code for running operating system 1212 and application programs 1214. Example data can include web pages, text, images, sound files, video data, or other data to be sent to and/or received from one or more network servers or other devices via one or more wired or wireless networks. Memory 1220 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

A number of programs may be stored in memory 1220. These programs include operating system 1212, one or more application programs 1214, and other program modules and program data. Examples of such application programs or program modules may include, for example, computer program logic (e.g., computer program code or instructions) for implementing one or more of system 100 of FIG. 1, system 200 of FIG. 2, system 600 of FIG. 6, system 700 of FIG. 7, and system 1100 of FIG. 11, along with any components and/or subcomponents thereof, as well as the flowcharts/flow diagrams described herein, including portions thereof, and/or further examples described herein.

Mobile device 1202 can support one or more input devices 1230, such as a touch screen 1232, a microphone 1234, a camera 1236, a physical keyboard 1238 and/or a trackball 1240 and one or more output devices 1250, such as a speaker 1252 and a display 1254. Other possible output devices (not shown) can include piezoelectric or other haptic output devices. Some devices can serve more than one input/output function. For example, touch screen 1232 and display 1254 can be combined in a single input/output device. Input devices 1230 can include a Natural User Interface (NUI).

One or more wireless modems 1260 can be coupled to antenna(s) (not shown) and can support two-way communications between processor 1210 and external devices, as is well understood in the art. Modem 1260 is shown generically and can include a cellular modem 1266 for communicating with the mobile communication network 1204 and/or other radio-based modems (e.g., Bluetooth 1264 and/or Wi-Fi 1262). At least one wireless modem 1260 is typically configured for communication with one or more cellular networks, such as a GSM network for data and voice communications within a single cellular network, between cellular networks, or between the mobile device and a public switched telephone network (PSTN).

Mobile device 1202 can further include at least one input/output port 1280, a power supply 1282, a satellite navigation system receiver 1284, such as a Global Positioning System (GPS) receiver, an accelerometer 1286, and/or a physical connector 1290, which can be a USB port, IEEE 1394 (FireWire) port, and/or RS-232 port. The illustrated components of mobile device 1202 are not required or all-inclusive, as any components can be deleted and other components can be added as would be recognized by one skilled in the art.

In an embodiment, mobile device 1202 is configured to implement any of the above-described features of flowcharts herein. Computer program logic for performing any of the operations, steps, and/or functions described herein may be stored in memory 1220 and executed by processor 1210.

Figure 13:
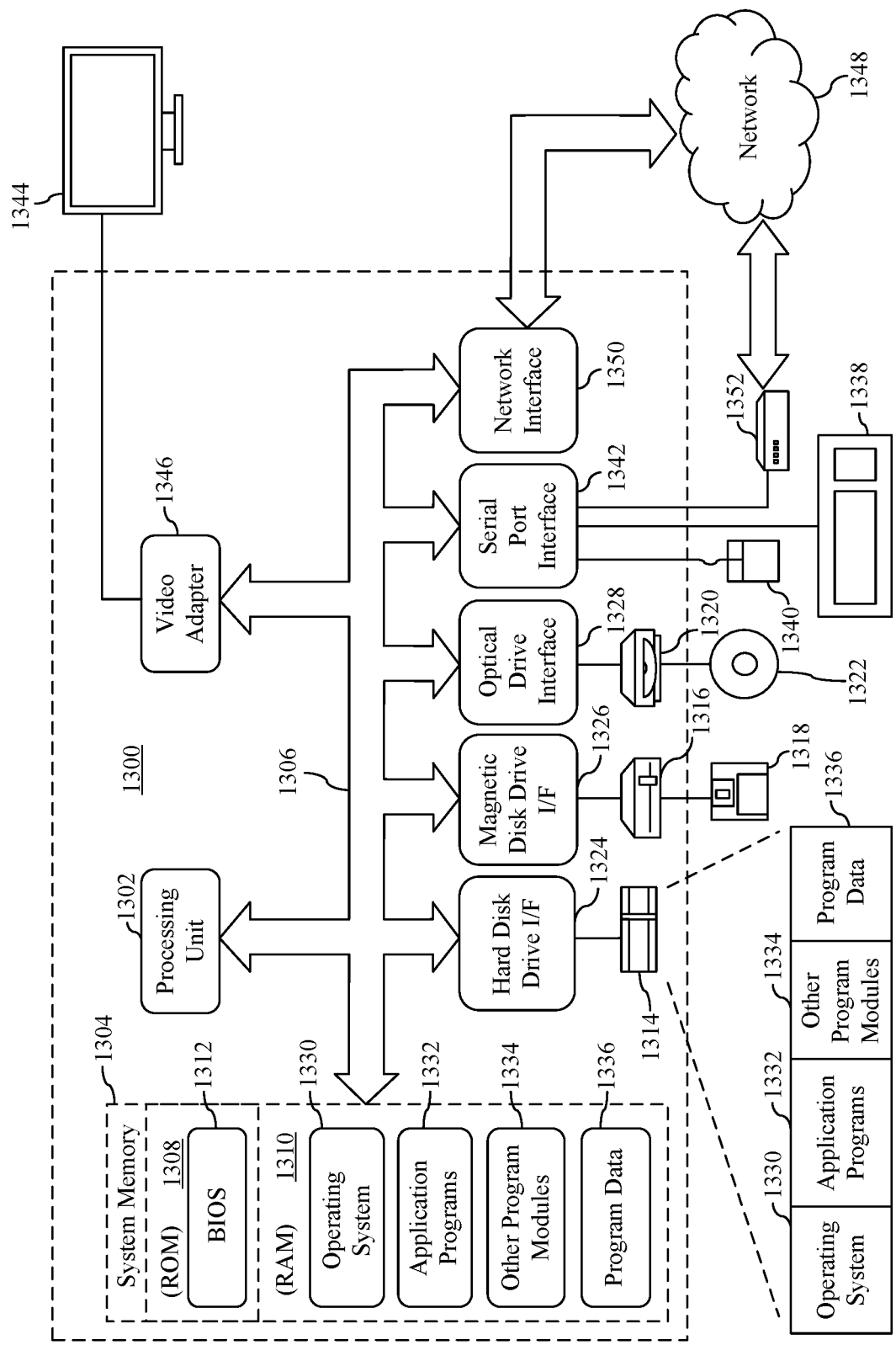
FIG. 13 shows a block diagram of an example computing device that may be used to implement embodiments.

FIG. 13 depicts an exemplary implementation of a computing device 1300 in which embodiments may be implemented. For example, embodiments described herein may be implemented in one or more computing devices similar to computing device 1300 in stationary or mobile computer embodiments, including one or more features of computing device 1300 and/or alternative features. The description of computing device 1300 provided herein is provided for purposes of illustration, and is not intended to be limiting. Embodiments may be implemented in further types of computer systems and/or game consoles, etc., as would be known to persons skilled in the relevant art(s).

As shown in FIG. 13, computing device 1300 includes one or more processors, referred to as processor circuit 1302, a system memory 1304, and a bus 1306 that couples various system components including system memory 1304 to processor circuit 1302. Processor circuit 1302 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1302 may execute program code stored in a computer readable medium, such as program code of operating system 1330, application programs 1332, other programs 1334, etc. Bus 1306 represents one or more of any of several types of bus structures, including a memory bus or memory controller, a peripheral bus, an accelerated graphics port, and a processor or local bus using any of a variety of bus architectures. System memory 1304 includes read only memory (ROM) 1308 and random access memory (RAM) 1310. A basic input/output system 1312 (BIOS) is stored in ROM 1308.

Computing device 1300 also has one or more of the following drives: a hard disk drive 1314 for reading from and writing to a hard disk, a magnetic disk drive 1316 for reading from or writing to a removable magnetic disk 1318, and an optical disk drive 1320 for reading from or writing to a removable optical disk 1322 such as a CD ROM, DVD ROM, or other optical media. Hard disk drive 1314, magnetic disk drive 1316, and optical disk drive 1320 are connected to bus 1306 by a hard disk drive interface 1324, a magnetic disk drive interface 1326, and an optical drive interface 1328, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1330, one or more application programs 1332, other programs 1334, and program data 1336. Application programs 1332 or other programs 1334 may include, for example, computer program logic (e.g., computer program code or instructions) for implementing embodiments described herein, such as system 100 of FIG. 1, system 200 of FIG. 2, system 600 of FIG. 6, system 700 of FIG. 7, and system 1100 of FIG. 11, along with any components and/or subcomponents thereof, as well as the flowcharts/flow diagrams described herein, including portions thereof, and/or further examples described herein.

A user may enter commands and information into the computing device 1300 through input devices such as keyboard 1338 and pointing device 1340. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1302 through a serial port interface 1342 that is coupled to bus 1306, but may be connected by other interfaces, such as a parallel port, game port, or a universal serial bus (USB).

A display screen 1344 is also connected to bus 1306 via an interface, such as a video adapter 1346. Display screen 1344 may be external to, or incorporated in computing device 1300. Display screen 1344 may display information, as well as being a user interface for receiving user commands and/or other information (e.g., by touch, finger gestures, virtual keyboard, etc.). In addition to display screen 1344, computing device 1300 may include other peripheral output devices (not shown) such as speakers and printers.

Computing device 1300 is connected to a network 1348 (e.g., the Internet) through an adaptor or network interface 1350, a modem 1352, or other means for establishing communications over the network. Modem 1352, which may be internal or external, may be connected to bus 1306 via serial port interface 1342, as shown in FIG. 13, or may be connected to bus 1306 using another interface type, including a parallel interface.

As used herein, the terms "computer program medium," "computer-readable medium," and "computer-readable storage medium," etc., are used to refer to physical hardware media. Examples of such physical hardware media include the hard disk associated with hard disk drive 1314, removable magnetic disk 1318, removable optical disk 1322, other physical hardware media such as RAMs, ROMs, flash memory cards, digital video disks, zip disks, MEMs, nanotechnology-based storage devices, and further types of physical/tangible hardware storage media (including memory 1320 of FIG. 13). Such computer-readable media and/or storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1332 and other programs 1334) may be stored on the hard disk, magnetic disk, optical disk, ROM, RAM, or other hardware storage medium. Such computer programs may also be received via network interface 1350, serial port interface 1342, or any other interface type. Such computer programs, when executed or loaded by an application, enable computing device 1300 to implement features of embodiments discussed herein. Accordingly, such computer programs represent controllers of the computing device 1300.

Embodiments are also directed to computer program products comprising computer code or instructions stored on any computer-readable medium or computer-readable storage medium. Such computer program products include hard disk drives, optical disk drives, memory device packages, portable memory sticks, memory cards, and other types of physical storage hardware.

IV. Additional Example and Advantages

As described, systems and devices embodying the techniques herein may be configured and enabled in various ways to perform their respective functions. In embodiments, one or more of the steps or operations of any flowchart and/or flow diagram described herein may not be performed. Moreover, steps or operations in addition to or in lieu of those in any flowchart and/or flow diagram described herein may be performed. Further, in examples, one or more operations of any flowchart and/or flow diagram described herein may be performed out of order, in an alternate sequence, or partially (or completely) concurrently with each other or with other operations.

While embodiments described in the Sections above may be described in the context of keyboard inputs, the embodiments herein are not so limited and may also be applied through other input devices and modalities. Moreover, punctuation characters such as periods are also contemplated as inputs fulfilling the acceptance of completion options provided to users.

Furthermore, the described embodiments do not exist in software implementations for enhancements and improvements in cooperative text recommendation acceptance of completion options in a UI. Conventional solutions lack the ability to increase input efficient and speed via a UI using space characters and alphanumeric characters, e.g., as representing input to follow after recommended completion options of user inputs. The UI improvements described herein also provide further increases for text inputs for very fast typists that conventional solution do not.

The additional examples and embodiments described in this Section may be applicable to examples disclosed in any other Section or subsection of this disclosure.

A user system is described herein. The may be configured and enabled in various ways to enhance and improve cooperative text recommendation acceptance of completion options in a UI, as described herein. The system includes processing system with one or more processors and a memory that stores program code to be executed by the processing system. The program code includes an input buffer configured to receive a first portion of a first input submitted by a user via a user interface (UI). The program code also includes a pattern engine configured to generate a statistical probability for each of a plurality of completion options of the first input based at least on the first portion of the first input, select one completion option of the plurality of completion options based at least on its statistical probability, and generate an acceptance command for the selected completion option based on a second portion of a second input generated by the user via the UI, and received by the input buffer, that represents an alphanumeric character or a space character. The program code also includes an output manager configured to cause the selected completion option to be displayed to the user via the UI with a characteristic that is different from the first portion of the first input, and accept the selected completion option based on the acceptance command.

In an embodiment of the system, the pattern engine is configured to generate the statistical probability for said each of the plurality of completion options based at least on one or more of prior inputs stored by the input buffer or a language model of the user.

In an embodiment of the system, the input buffer is configured to store at least the first portion of the first input and one or more prior inputs according to a buffer size, and receive subsequent inputs generated by the user via the UI. In the embodiment the system further includes an error corrector configured to monitor the subsequent inputs, and correct, based at least on the subsequent inputs, at least one of the selected completion option or the one or more prior inputs.

In an embodiment of the system, the pattern engine is configured to generate the statistical probability for said each of the plurality of completion options based on a number of characters that are represented in the first portion of the first input, and the input buffer is configured to track corrections to selected completion options made by the user, track acceptances of the selected completion options made by the user, and provide a number of the corrections and a number of the acceptances to the pattern engine. In the embodiment, the pattern engine is further configured to increase the number of characters based on the number of the corrections, and decrease the number of characters based on the number of the acceptances.

In an embodiment of the system, the pattern engine is configured to determine that the selected completion option has a length that equals or that exceeds a length threshold, determine a recommendation length that is less than, or equal to, the length threshold based on the statistical probability for the selected completion option, and provide another acceptance command for a third portion of the selected completion option that is of the recommendation length to the output manager based on a third portion of the first input generated by the user via the UI, and received by the input buffer, that represents another alphanumeric character or another space character.

In an embodiment of the system, the pattern engine is configured to identify one or more of at least one character, at least one n-gram, at least one phoneme, or at least one word as identified input from the first portion of the first input, and determine said each of the plurality of completion options based at least on a first comparison of the identified input with a stored data structure that includes one or more of a plurality of phonemes, a plurality of words, a plurality of phrases, a plurality of acronyms, a plurality of n-grams, or a plurality of abbreviations.

In an embodiment of the system, the error corrector is configured to determine a potential typographical error is present in the first portion of the first input or one or more prior inputs stored by the input buffer based on a second comparison of the identified input with content of the stored data structure, and identify a correction for the potential typographical error. In the embodiment, the pattern engine is configured to determine a statistical likelihood or a weighted statistical likelihood for a correction of the first portion of the first input or the one or more prior inputs stored by the input buffer that corrects the potential typographical error, the statistical likelihood or the weighted statistical likelihood being based on zero or more of a transposed or incorrectly ordered set of alphanumeric characters in the first portion of the first input or the one or more prior inputs stored by the input buffer, or a proximity of a first key to a second key on a keyboard. In the embodiment, the pattern engine is also configured to determine said each of the plurality of completion options based on one or more of the statistical likelihood, the weighted statistical likelihood, or the correction.

In an embodiment of the system, the output manager is configured to highlight via the UI a region of uncertainty related to the potential typographical error in the first portion of the first input or the one or more prior inputs stored by the input buffer.

In an embodiment of the system, the output manager is configured to receive an indication that a user has entered additional input via the UI that is stored in the input buffer and that corresponds to an initial part of the selected completion option, cause the UI to maintain display of a remaining part of the one prediction recommendation, and accept the remaining part of the one prediction recommendation based on another acceptance command generated by the pattern engine.

In an embodiment of the system, the pattern engine is configured to determine that the alphanumeric character representation has another statistical probability of following the selected completion option that exceeds a statistical probability threshold value and corresponds to one or more characters of a phoneme, a word, a phrase, an acronym, an n-gram, or an abbreviation, and generate the acceptance command for the selected completion option based at least on the other statistical probability exceeding the statistical probability threshold value.

In an embodiment of the system, the input buffer is configured to support a plurality of input modalities from a corresponding plurality of input/output interfaces.

A computer-implemented method is also described herein. The method may be for enhancing and improving cooperative text recommendation acceptance of completion options in a UI, as described herein. The method includes storing a first portion of a first input submitted by a user via a user interface (UI) in a data structure of an input buffer, generating first statistical probabilities for each of a plurality of completion options of the first input based at least on the first portion of the first input, and selecting one completion option of the plurality of completion options based at least on its statistical probability. The method also includes causing the selected completion option to be displayed to the user via the UI with a characteristic that is different from the first portion of the first input, storing a second portion of a second input generated by the user via the UI in the data structure of the input buffer subsequent to said causing, and determining that the second portion of the second input has a second statistical probability, of following the selected completion option, that exceeds a statistical probability threshold value. The method further includes generating an acceptance command for the selected completion option based at least on the second statistical probability exceeding the statistical probability threshold value, and accepting the selected completion option based on the acceptance command.

In an embodiment, the method further includes generating second statistical probabilities for each of another plurality of completion options of the second input based at least on the second portion of the second input, selecting one other completion option of the other plurality of completion options based at least on a statistical probability of the other one completion option, and causing the selected other completion option to be displayed to the user via the UI with the characteristic.

In an embodiment of the method, at least one of the first portion of the first input or the second portion of the second input includes an alphanumeric character representation that corresponds to one or more characters of a phoneme, a word, a phrase, an acronym, an n-gram, or an abbreviation.

In an embodiment of the method, generating the statistical probability for said each of the plurality of completion options is based at least on one or more of prior inputs stored by the input buffer or a language model of the user.

In an embodiment, the method further includes determining a potential typographical error is present in the first portion of the first input or one or more prior inputs stored by the input buffer based on a second comparison of an identified input of the first portion or the one or more prior inputs with content of the stored data structure, the identified input comprising one or more of at least one character, at least one n-gram, at least one phoneme, or at least one word, and determining a statistical likelihood or a weighted statistical likelihood for a correction of the first portion of the first input or the one or more prior inputs stored by the input buffer that corrects the potential typographical error, the statistical likelihood or the weighted statistical likelihood being based on one or more of a transposed or incorrectly ordered set of alphanumeric characters in the first portion of the first input or the one or more prior inputs stored by the input buffer, or a proximity of a first key to a second key on a keyboard. In the embodiment, determining said each of the plurality of completion options is based on one or more of the statistical likelihood, the weighted statistical likelihood, or the correction.

In an embodiment, the method further includes receiving an indication that a user has entered additional input via the UI that is stored in the input buffer and that corresponds to an initial part of the selected completion option, and causing the UI to maintain display of a remaining part of the one prediction recommendation.

A computer-readable storage medium having program instructions recorded thereon that, when executed by a processing device, perform a method, is also described. The method may be for enhancing and improving cooperative text recommendation acceptance of completion options in a UI, as described herein. The method includes generating first statistical probabilities for each of a plurality of completion options of a first input submitted by a user via a user interface (UI) based at least on a first portion of the first input, and selecting one completion option of the plurality of completion options based at least on its statistical probability. The method also includes causing the selected completion option to be displayed to the user as completing the first input via the UI with a characteristic that is different from the first portion of the first input, and monitoring the input buffer for a second portion of a second input generated by the user via the UI having at least one alphanumeric character or a space character that represents an acceptance command to accept the selected completion option.

In an embodiment of the computer-readable storage medium, the method includes accepting the selected completion option subsequent to generation of the acceptance command for the selected completion option, the acceptance command generated based at least on a determination that the second portion of the second input includes at least one alphanumeric character having a second statistical probability of following the selected completion option that exceeds a statistical probability threshold value.

In an embodiment of the computer-readable storage medium, the method includes initiating a completion timer responsive to said causing the selected completion option to be displayed to the user, and at least one of causing the selected completion option to be removed from the UI based on the expiration of a completion timer, and terminating said monitoring; or including an acceptance timing indication as a factor to determine the second statistical probability based on an acceptance time being reached by the completion timer.

V. Conclusion

While various embodiments of the disclosed subject matter have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the disclosed subject matter should not be limited by any of the above-described exemplary embodiments, but should be defined only in accordance with the following claims and their equivalents.

What is claimed is:

1. A system, comprising:
a processing system comprising one or more processors; and
a memory configured to store program code to be executed by the processing system, the program code including:
an input buffer configured to receive a first portion of a first input submitted by a user via a user interface (UI) and a second portion of a second input generated by the user via the UI;
a pattern engine configured to:
generate a statistical probability for each of a plurality of completion options of the first input based at least on the first portion of the first input;
select one completion option of the plurality of completion options based at least on its statistical probability;
determine that an alphanumeric character representation included in the second portion of the second input has another statistical probability, that exceeds a statistical probability threshold value, of following the selected completion option; and
generate an acceptance command for the selected completion option based on the other statistical probability of the alphanumeric character representation exceeding the statistical probability threshold value; and
an output manager configured to:
cause the selected completion option to be displayed to the user via the UI with a characteristic that is different from the first portion of the first input; and
accept the selected completion option based on the acceptance command.

2. The system of claim 1, wherein the pattern engine is configured to:
generate the statistical probability for said each of the plurality of completion options based at least on one or more of prior inputs stored by the input buffer or a language model of the user.

3. The system of claim 1, wherein the input buffer is configured to:
store at least the first portion of the first input and one or more prior inputs according to a buffer size; and
receive subsequent inputs generated by the user via the UI; and
wherein the system further comprises an error corrector configured to:
monitor the subsequent inputs; and
correct, based at least on the subsequent inputs, at least one of the selected completion option or the one or more prior inputs.

4. The system of claim 1, wherein the pattern engine is configured to:
generate the statistical probability for said each of the plurality of completion options based on a number of characters that are represented in the first portion of the first input;
wherein the input buffer is configured to:
track corrections to selected completion options made by the user;
track acceptances of the selected completion options made by the user; and
provide a number of the corrections and a number of the acceptances to the pattern engine; and
wherein the pattern engine is further configured to:
increase the number of characters based on the number of the corrections; and
decrease the number of characters based on the number of the acceptances.

5. The system of claim 1, wherein the pattern engine is configured to:
determine that the selected completion option has a length that equals or that exceeds a length threshold;
determine a recommendation length that is less than, or equal to, the length threshold based on the statistical probability for the selected completion option; and provide another acceptance command for a third portion of the selected completion option that is of the recommendation length to the output manager based on a third portion of the first input generated by the user via the UI, and received by the input buffer, that represents another alphanumeric character.

6. The system of claim 1, wherein the pattern engine is configured to:
identify one or more of at least one character, at least one n-gram, at least one phoneme, or at least one word as identified input from the first portion of the first input; and
determine said each of the plurality of completion options based at least on a first comparison of the identified input with a stored data structure that includes one or more of a plurality of phonemes, a plurality of words, a plurality of phrases, a plurality of acronyms, a plurality of n-grams, or a plurality of abbreviations.

7. The system of claim 6, wherein the error corrector is configured to:
determine a potential typographical error is present in the first portion of the first input or one or more prior inputs stored by the input buffer based on a second comparison of the identified input with content of the stored data structure; and
identify a correction for the potential typographical error; and
wherein the pattern engine is configured to:
determine a statistical likelihood or a weighted statistical likelihood for a correction of the first portion of the first input or the one or more prior inputs stored by the input buffer that corrects the potential typographical error, the statistical likelihood or the weighted statistical likelihood being based on zero or more of:
a transposed or incorrectly ordered set of alphanumeric characters in the first portion of the first input or the one or more prior inputs stored by the input buffer, or
a proximity of a first key to a second key on a keyboard; and
determine said each of the plurality of completion options based on one or more of the statistical likelihood, the weighted statistical likelihood, or the correction.

8. The system of claim 7, wherein the output manager is configured to:
highlight via the UI a region of uncertainty related to the potential typographical error in the first portion of the first input or the one or more prior inputs stored by the input buffer.

9. The system of claim 7, wherein the output manager is configured to:
receive an indication that a user has entered additional input via the UI that is stored in the input buffer and that corresponds to an initial part of the selected completion option;
cause the UI to maintain display of a remaining part of the one prediction recommendation; and
accept the remaining part of the one prediction recommendation based on another acceptance command generated by the pattern engine.

10. The system of claim 1, wherein
the alphanumeric character representation corresponds to one or more characters of:
a phoneme, a word, a phrase, an acronym, an n-gram, or an abbreviation.

11. The system of claim 1, wherein the input buffer is configured to support a plurality of input modalities from a corresponding plurality of input/output interfaces.

12. A computer-implemented method comprising:
storing a first portion of a first input submitted by a user via a user interface (UI) in a data structure of an input buffer;
generating first statistical probabilities for each of a plurality of completion options of the first input based at least on the first portion of the first input;
selecting one completion option of the plurality of completion options based at least on its statistical probability;
causing the selected completion option to be displayed to the user via the UI with a characteristic that is different from the first portion of the first input;
storing a second portion of a second input generated by the user via the UI in the data structure of the input buffer subsequent to said causing, the second portion comprising an alphanumeric character representation;
determining that the alphanumeric character representation of the second portion of the second input has a second statistical probability, of following the selected completion option, that exceeds a statistical probability threshold value;
generating an acceptance command for the selected completion option based at least on the second statistical probability exceeding the statistical probability threshold value; and
accepting the selected completion option based on the acceptance command.

13. The computer-implemented method of claim 12, further comprising:
generating second statistical probabilities for each of another plurality of completion options of the second input based at least on the second portion of the second input;
selecting one other completion option of the other plurality of completion options based at least on a statistical probability of the other one completion option; and
causing the selected other completion option to be displayed to the user via the UI with the characteristic.

14. The computer-implemented method of claim 12, wherein the alphanumeric character representation corresponds to one or more characters of:
a phoneme, a word, a phrase, an acronym, an n-gram, or an abbreviation.

15. The computer-implemented method of claim 12, wherein said generating the first statistical probabilities for said each of the plurality of completion options is based at least on one or more of prior inputs stored by the input buffer or a language model of the user.

16. The computer-implemented method of claim 12, further comprising:
determining a potential typographical error is present in the first portion of the first input or one or more prior inputs stored by the input buffer based on a second comparison of an identified input of the first portion or the one or more prior inputs with content of the stored data structure, the identified input comprising one or more of at least one character, at least one n-gram, at least one phoneme, or at least one word;
determining a statistical likelihood or a weighted statistical likelihood for a correction of the first portion of the first input or the one or more prior inputs stored by the input buffer that corrects the potential typographical error, the statistical likelihood or the weighted statistical likelihood being based on one or more of:
  a transposed or incorrectly ordered set of alphanumeric characters in the first portion of the first input or the one or more prior inputs stored by the input buffer, or
  a proximity of a first key to a second key on a keyboard; and
determining said each of the plurality of completion options based on one or more of the statistical likelihood, the weighted statistical likelihood, or the correction.

17. The computer-implemented method of claim 12, further comprising:
  receiving an indication that a user has entered additional input via the UI that is stored in the input buffer and that corresponds to an initial part of the selected completion option; and
  causing the UI to maintain display of a remaining part of the one prediction recommendation.

18. A computer-readable storage medium having program instructions recorded thereon that, when executed by at least one processing device, configure the at least one processing device to perform a method, the method comprising:
  generating first statistical probabilities for each of a plurality of completion options of a first input submitted by a user via a user interface (UI), and stored in an input buffer, based at least on a first portion of the first input;
  selecting one completion option of the plurality of completion options based at least on its statistical probability;
  causing the selected completion option to be displayed to the user as completing the first input via the UI with a characteristic that is different from the first portion of the first input; and
  monitoring the input buffer for a second portion of a second input, generated by the user via the UI and having at least one alphanumeric character representation, that causes generation of an acceptance command to accept the selected completion option, the acceptance command being generated based at least on a determination that the at least one alphanumeric character representation has a second statistical probability, of following the selected completion option, that exceeds a statistical probability threshold value.

19. The computer-readable storage medium of claim 18, wherein the method comprises:
  accepting the selected completion option subsequent to generation of the acceptance command for the selected completion option.

20. The computer-readable storage medium of claim 18, wherein the method comprises:
  initiating a completion timer responsive to said causing the selected completion option to be displayed to the user; and
  at least one of:
    causing the selected completion option to be removed from the UI based on the expiration of a completion timer, and
    terminating said monitoring; or
    including an acceptance timing indication as a factor to determine the second statistical probability based on an acceptance time being reached by the completion timer.

* * * * *